United States Patent
Yoneda

(10) Patent No.: US 9,899,179 B2
(45) Date of Patent: Feb. 20, 2018

(54) SHORT-CIRCUIT ELEMENT AND A CIRCUIT USING THE SAME

(71) Applicant: DEXERIALS CORPORATION, Tokyo (JP)

(72) Inventor: Yoshihiro Yoneda, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 343 days.

(21) Appl. No.: 14/818,862

(22) Filed: Aug. 5, 2015

(65) Prior Publication Data

US 2015/0340186 A1    Nov. 26, 2015

Related U.S. Application Data

(63) Continuation of application No. PCT/JP2014/052634, filed on Feb. 5, 2014.

(30) Foreign Application Priority Data

| Feb. 5, 2013 | (JP) | ................................ | 2013-020756 |
| Feb. 8, 2013 | (JP) | ................................ | 2013-023171 |
| Feb. 12, 2013 | (JP) | ................................ | 2013-024643 |
| Jun. 13, 2013 | (JP) | ................................ | 2013-125077 |
| Jun. 13, 2013 | (JP) | ................................ | 2013-125078 |
| Jun. 13, 2013 | (JP) | ................................ | 2013-125079 |

(51) Int. Cl.
*H01H 85/00*    (2006.01)
*H01H 85/02*    (2006.01)
(Continued)

(52) U.S. Cl.
CPC ........ *H01H 85/055* (2013.01); *H01H 37/761* (2013.01); *H01H 37/767* (2013.01);
(Continued)

(58) Field of Classification Search
CPC .... H01H 37/761; H01H 37/767; H01H 61/02; H01H 85/0056; H01H 85/0241; H01H 85/055; H01H 2231/026; H01M 2/348; H01M 10/425; H01M 10/441; H01M 10/482; H01M 2200/10; H01M 2200/103; H01M 2200/108
(Continued)

(56) References Cited

U.S. PATENT DOCUMENTS 6,275,005 B1 *  8/2001  Stadnick .................. H01M 2/34
                                                         257/665
6,420,852 B1     7/2002  Sato

FOREIGN PATENT DOCUMENTS

| JP | 2000-133318 A | 5/2000 |
| JP | 2007-012381 A | 1/2007 |
| JP | 2010-003665 A | 1/2010 |

OTHER PUBLICATIONS

Mar. 4, 2014 International Search Report issued in International Application No. PCT/JP2014/052634.
(Continued)

*Primary Examiner* — Thienvu Tran
*Assistant Examiner* — Kevin J Comber
(74) *Attorney, Agent, or Firm* — Oliff PLC

(57) ABSTRACT

A bypass avoiding only abnormal cells or abnormal electronic components in an electronic appliance having a plurality of battery cells or electronic components is formed to decrease resistance while keeping functionality.

69 Claims, 13 Drawing Sheets

(51) Int. Cl.
*H01M 2/34* (2006.01)
*H01H 85/055* (2006.01)
*H01H 37/76* (2006.01)
*H01H 61/02* (2006.01)
*H01M 10/42* (2006.01)
*H01M 10/44* (2006.01)
*H01M 10/48* (2006.01)

(52) U.S. Cl.
CPC ........ *H01H 61/02* (2013.01); *H01H 85/0056* (2013.01); *H01H 85/0241* (2013.01); *H01M 2/348* (2013.01); *H01M 10/425* (2013.01); *H01M 10/441* (2013.01); *H01M 10/482* (2013.01); *H01H 2231/026* (2013.01); *H01M 2200/10* (2013.01); *H01M 2200/103* (2013.01); *H01M 2200/108* (2013.01)

(58) Field of Classification Search
USPC .......................................................... 361/54
See application file for complete search history.

(56) References Cited

OTHER PUBLICATIONS

Nov. 17, 2017 Office Action issued in U.S. Appl. No. 14/819,328.
Nov. 20, 2017 Office Action issued in U.S. Appl. No. 14/819,061.

\* cited by examiner

SHORT-CIRCUIT ELEMENT AND A CIRCUIT USING THE SAME

TECHNICAL FIELD

This invention relates to a short-circuit element and a circuit using the same having a heat-generating resistor and a fuse element formed on a substrate to bypass only abnormal components within an electronic appliance.

BACKGROUND ART

Secondary batteries are often provided to users in the form of rechargeable battery packs which can be repeatedly used. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Some of these protective elements use an FET switch incorporated in a battery pack to turn ON/OFF the output, for over-charging or over-discharging protection of the battery pack. However, even in the cases of the FET switch being short-circuited and damaged for some reason, a large current momentarily flows caused by a surge such as a lightning surge, and an abnormally decreased output voltage or an excessively high voltage occurs in an aged battery cell, the battery pack or the electronic appliance should prevent accidents including fire, among others. For this reason, a protective element is used having a fuse which interrupts a current path in accordance with an external signal so as to safely interrupt the output of the battery cell under these possible abnormalities.

PLT 1 discloses a protective element of a protective circuit for a lithium ion secondary battery in which a meltable conductor is connected as a part of a current path from a first electrode, through a conductive layer connected to a heat-generating element, to a second electrode, and this meltable conductor in the current path is blown by self-heating due to an overcurrent or by a heat-generating element provided in the protective element. In this protective element, the current path is interrupted by gathering of the fused meltable conductor in liquid phase onto the conducting layer connected to the heat-generating element.

Furthermore, there has been proposed an LED illumination apparatus in which short-circuit elements are connected to serially connected LED elements in parallel, the short-circuit elements are short-circuited by a predetermined abnormal voltage and normal LEDs emit light (PLT 2). In the short-circuit element of PLT 2, several elements sandwiching an insulating barrier layer having a predetermined film thickness are connected in series.

PRIOR ART LITERATURE

Patent Literatures

PLT 1: Japanese Unexamined Patent Application Publication No. 2010-003665
PLT 2: Japanese Unexamined Patent Application Publication No. 2007-12381

SUMMARY OF THE INVENTION

Problem to be Solved by the Invention

In recent years, hybrid electric vehicles (HEVs) and electric vehicles (EVs) using batteries and motors have become widely used. Lithium ion secondary batteries are employed as power sources for HEVs and EVs because of their advantages in energy density and output properties. These automotive applications require a high voltage and a large current. For this reason, many dedicated cells capable of enduring a high voltage and a large current are under development; however, in many cases, a plurality of general-purpose battery cells are provided and connected in series or in parallel to achieve necessary voltage and current.

In a vehicle such as an automobile moving at a high speed, there are cases in which a rapid decrease in driving power or a sudden stop of the vehicle is dangerous; therefore, a battery management appropriate for abnormal situations is required. For example, when a battery system abnormality occurs during vehicle operation, driving power to move to a repair shop or safe location and power to a hazard lamp or air conditioner is preferably supplied in view of risk avoidance.

Unfortunately, the battery pack of PLT 1 in which several battery cells are connected in series and the protective element is provided only on a charging/discharging path, when an abnormality occurs in a part of the battery cell activates the protective element, the entire charging/discharging path of the battery pack is interrupted such that the battery pack can no longer power.

On the other hand, in the short-circuit element described in PLT 2, the current/voltage characteristics curve exhibits a high resistance of 17 kΩ upon voltage application of 10 V; it is therefore desired to further decrease the resistance value in order to efficiently bypass an LED element in open state.

An object of the present invention therefore is to provide a short-circuit element and a circuit using the same capable of effectively utilize normal cells by forming a bypass path avoiding only abnormal cells in a battery pack having several cells.

Solution to Problem

An aspect of the present invention provides a short-circuit element comprising: an insulating substrate; a first and a second heat-generating resistors formed on the insulating substrate; a first and a second electrodes arranged adjacently to each other on the insulating substrate; a third electrode arranged adjacently to the first electrode on the insulating substrate and electrically connected to the first heat-generating resistor; a fourth electrode arranged adjacently to the second electrode on the insulating substrate and electrically connected to the second heat-generating resistor; a fifth electrode arranged adjacently to the fourth electrode; a first meltable conductor arranged between the first and third electrodes to constitute a current path capable of being blown by a heat generated by the first heat-generating resistor; and a second meltable conductor arranged between the second and fifth electrodes through the fourth electrode to constitute a current path, in which the current path between the second and fourth electrodes and between the fourth and fifth electrodes are capable of being blown by a heat generated by the second heat-generating resistor, wherein the first and second meltable conductors are melted by the heat from the first and second heat-generating resistors and gather on the first and second electrodes to short-circuit the first and second electrodes.

Another aspect of the present invention provides a short-circuit element circuit comprising: a switch; a first fuse connected to one end of the switch; a first heat-generating resistor connected to an open end of the first fuse; a second and a third fuses serially connected to an open end of the switch; and a second heat-generating resistor connected to a connecting point of the second and the third fuses, wherein the second and the third fuses are blown by a heat generated by the second heat-generating resistor, and wherein the first fuse is blown by a heat generated by the first heat-generating resistor, and the switch is short-circuited by meltable conductor of the first fuse.

Another aspect of the present invention provides a compensation circuit comprising: a short-circuit element comprising a switch, a first fuse connected to one end of the switch, a first heat-generating resistor connected to an open end of the first fuse, a second and a third fuses serially connected to an open end of the switch, and a second heat-generating resistor connected to a connecting point of the second and the third fuses, wherein the second and the third fuses are blown by a heat generated by the second heat-generating resistor, and the first fuse is blown by a heat generated by the first heat-generating resistor, and the switch is short-circuited by meltable conductor of the first fuse; an electronic component; a protective component which detects an abnormality of the electronic component and outputs an abnormal signal; and a first and a second controlling elements which operate in accordance with the abnormal signal from the protective component, wherein the second and third fuses are serially connected to the electronic component to constitute a current path, wherein the connecting point of the switch and the first fuse is bypassed to an open end of the electronic component, wherein the first controlling element is connected to an open end of the first heat-generating resistor, wherein the second controlling element is connected to an open end of the second heat-generating resistor, and wherein in an abnormal situation of the electronic component, the first and second controlling elements operate in accordance with an abnormal signal from the protective component to disconnect the current path of the electronic component and to short-circuit the switch in conjunction with melting of the first fuse to form a bypass current path.

Another aspect of the present invention provides a short-circuit element circuit comprising: a switch; a first fuse connected to one end of the switch; a first heat-generating resistor connected to an open end of the first fuse; a protective resistor connected to a connecting point of the switch and the first fuse; a second and a third fuses serially connected to an open end of the switch; and a second heat-generating resistor connected to a connecting point of the second and the third fuses, wherein the second and the third fuses are blown by a heat generated by the second heat-generating resistor, and wherein the first fuse is blown by a heat generated by the first heat-generating resistor, and the switch is short-circuited by meltable conductor of the first fuse.

Another aspect of the present invention provides a compensation circuit comprising: a short-circuit element comprising a switch, a first fuse connected to one end of the switch, a first heat-generating resistor connected to an open end of the first fuse, a protective resistor connected to a connecting point of the switch and the first fuse, a second and a third fuses serially connected to an open end of the switch, and a second heat-generating resistor connected to a connecting point of the second and the third fuses, wherein the second and the third fuses are blown by a heat generated by the second heat-generating resistor, and the first fuse is blown by a heat generated by the first heat-generating resistor, and the switch is short-circuited by meltable conductor of the first fuse; an electronic component; a protective component which detects an abnormality of the electronic component and outputs an abnormal signal; and a first and a second controlling elements which operate in accordance with the abnormal signal from the protective component, wherein the second and third fuses are serially connected to the electronic component to constitute a current path, wherein the connecting point of the switch and the first fuse is bypassed to an open end of the electronic component, wherein the first controlling element is connected to an open end of the first heat-generating resistor, wherein the second controlling element is connected to an open end of the second heat-generating resistor, and wherein, in an abnormal situation of the electronic component, the first and second controlling elements operate in accordance with an abnormal signal from the protective component to disconnect the current path of the electronic component and to short-circuit the switch in conjunction with melting of the first fuse to form a bypass current path.

Another aspect of the present invention provides a mounting member in which a short-circuit element is mounted onto a mounting target, the short-circuit element comprising: an insulating substrate; a first and a second heat-generating resistors formed on the insulating substrate; a first and a second electrodes arranged adjacently to each other on the insulating substrate; a third electrode arranged adjacently to the first electrode on the insulating substrate and electrically connected to the first heat-generating resistor; a fourth electrode arranged adjacently to the second electrode on the insulating substrate and electrically connected to the second heat-generating resistor; a fifth electrode arranged adjacently to the fourth electrode; a first meltable conductor arranged between the first and third electrodes to constitute a current path capable of being blown by a heat generated by the first heat-generating resistor; a second meltable conductor arranged between the second and fifth electrodes through the fourth electrode to constitute a current path, in which the current paths between the second and fourth electrodes and between the fourth and fifth electrodes are capable of being blown by a heat generated by the second heat-generating resistor; and a first external connecting electrode continuous with the first electrode formed on the same surface as the first and second electrodes, and a second external connecting electrode continuous with the second electrode, wherein the first electrode is connected to the mounting target via the first external connecting terminal connected to the first external connecting electrode, and the second electrode is connected to the mounting target via the second external connecting terminal connected to the second external connecting electrode, and wherein a combined resistance of the first external connecting terminal and the second external connecting terminal is lower than a conduction resistance between the first and second external connecting electrodes when the first meltable conductor is melted by the heat from the first and second heat-generating resistors and gathers on the first and second electrodes to short-circuit the first and second electrodes.

Advantageous Effects of Invention

Moreover, the present invention can form a new bypass current path by short-circuiting normally-isolated first and second electrode by a meltable conductor gathered on the first and second electrode melted by heat from first and second heat-generating resistors.

DESCRIPTION OF THE EMBODIMENTS

Figure 1A:
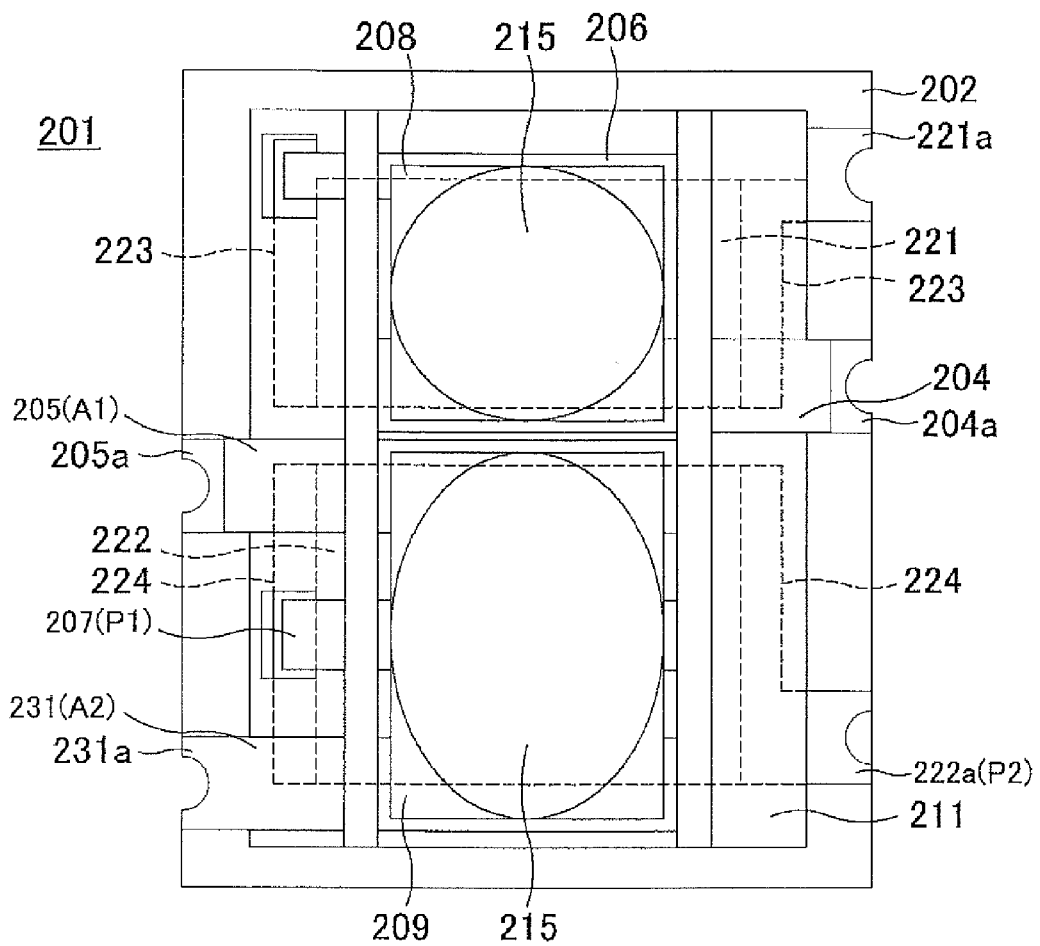
FIG. 1(A) is a plan view of short-circuit element according to the present invention and FIG. 1(B) is a cross-sectional view of the same.

Embodiments of short-circuit elements according to the present invention and circuits using the same will now be more particularly described with reference to the accompanying drawings. It should be noted that the present invention is not limited to the embodiments described below and various modifications can be added to the embodiment without departing from the scope of the present invention. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

EMBODIMENT

Short-Circuit Element

Figure 1B:
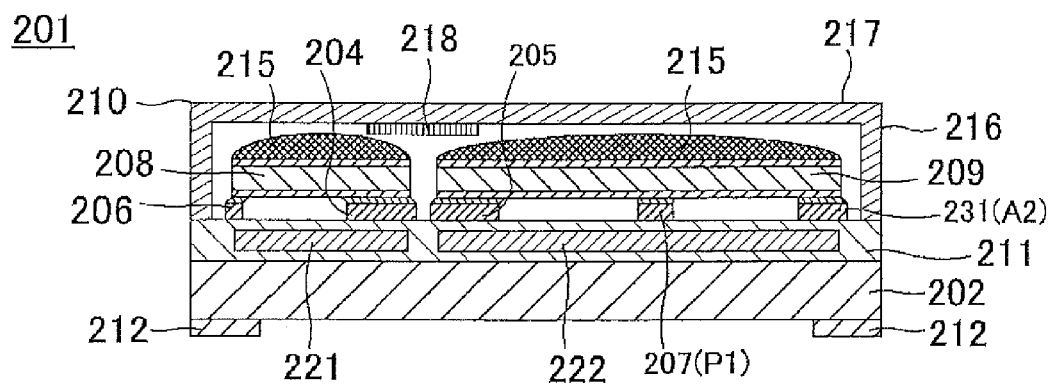

Next, an embodiment of the present invention will be explained below. FIG. 1(A) is a plan view of short-circuit element 201 and FIG. 1(B) is a cross-sectional view of the short-circuit element 201. The short-circuit element 201 comprises: an insulating substrate 202; a first heat-generating resistor 221 and a second heat-generating resistor 222 formed on the insulating substrate 202; a first electrode 204 and a second electrode 205 (A1) arranged adjacently to each other on the insulating substrate 202; a third electrode 206 arranged adjacently to the first electrode 204 and electrically connected to the first heat-generating resistor 221; a fourth electrode 207 arranged adjacently to the second electrode 205 (A1) and electrically connected to the second heat-generating resistor 222; a fifth electrode 231 arranged adjacently to the fourth electrode 207 (P1); a first meltable conductor 208 arranged between the first and third electrodes 204, 206 to constitute a current path capable of being blown by a heat generated by the first heat-generating resistor 221; and a second meltable conductor 209 arranged between the second and fifth electrodes 205 (A1) and 231 (A2) through the fourth electrode 207 (P1) to constitute a current path, in which the current path are capable of being blown by a heat generated by the second heat-generating resistor 222. The short-circuit element 201 also includes a covering member 210 attached to the insulating substrate 202 for internal protection.

The insulating substrate 202 is formed in an approximately rectangular shape by using an insulating material such as alumina, glass ceramics, mullite and zirconia. Other materials used for printed circuit boards such as glass epoxy substrate or phenol substrate may be used as the insulating substrate 202; in these cases, however, the temperature at which the fuses are blown should be considered. The insulating substrate 202 also includes an external terminal 212 formed on the back surface thereof.

The first and second heat-generating resistors 221, 222 are made of a conductive material such as W, Mo and Ru, which has a relatively high resistance and generates a heat when a current flows therethrough. A powdered alloy, composition or compound of these materials is mixed with resin binder to obtain a paste, which is screen-printed as a pattern on the insulating substrate 202 and baked to form the first and second heat-generating resistors 221, 222.

The first and second heat-generating resistors 221, 222 are covered with an insulating layer 211 on the insulating substrate 202. The first and third electrodes 204, 206 are formed on the insulating layer 211 covering the first heat-generating resistor 221 and the second, fourth and fifth electrodes 205, 207 and 231 are formed on the insulating layer 211 covering the second heat-generating resistor 222. The first electrode 204 is arranged adjacently to and insulated from the second electrode 205 on one side. The third electrode 206 is arranged adjacently to the other side of the first electrode 204. The first electrode 204 and the third electrode 206 are connected by a first meltable conductor 208 to form a current path of the short-circuit element 201. The first electrode 204 also includes a first electrode terminal 204a exposed at a side of the insulating substrate 202. The first electrode terminal 204a is connected to the external terminal 212 formed on the back surface of the insulating substrate 202 via a through hole.

The third electrode 206 is connected to the first heat-generating resistor 221 via a first heat-generating element extracting electrode 223 formed on the insulating substrate 202 or insulating layer 211. The first heat-generating resistor 221 is also connected to a first resistor terminal 221a exposed at a peripheral edge of the insulating substrate 202 via the first heat-generating element extracting electrode 223. The first resistor terminal 221a is connected to the external terminal 212 formed on the back surface of the insulating substrate 202 via a through hole.

The fourth electrode 207 (P1) is arranged adjacent to a side of the second electrode 205 (A1) which is opposite to the side facing the first electrode 204. The fifth electrode 231 (A2) is arranged adjacent to a side of the fourth electrode 207 (P1) which is opposite to the side facing the second electrode 205 (A1). The second electrode 205 (A1), the fourth electrode 207 (P1) and the fifth electrode 231 (A2) are connected to a second meltable conductor 209. The second electrode 205 (A1) is also connected to a second electrode terminal 205a exposed at a side of the insulating substrate 202. The second electrode terminal 205a is connected to the external terminal 212 formed on the back surface of the insulating substrate 202 via a through hole.

The fourth electrode 207 (P1) is connected to the second heat-generating resistor 222 via a second heat-generating element extracting electrode 224 formed on the insulating substrate 202 or insulating layer 211. The second heat-generating resistor 222 is also connected to a first resistor terminal 222a exposed at a peripheral edge of the insulating substrate 202 via the second heat-generating element extracting electrode 224. The second resistor terminal 222a (P2) is connected to the external terminal 212 formed on the back surface of the insulating substrate 202 via a through hole.

Furthermore, the fifth electrode 231 (A2) is connected to the fifth electrode terminal 231a exposed at a peripheral edge of the insulating substrate 202. The fifth electrode terminal 231a is connected to the external terminal 212 formed on the back surface of the insulating substrate 202 via a through hole.

The first to fifth electrodes 204, 205, 206, 207 and 231 may be made of a common electrode material such as Cu and Ag; however, it is preferable that the surfaces of at least the first and second electrodes 204, 205 are coated by using a known plating process including Ni/Au plating, Ni/Pd plating and Ni/Pd/Au plating. This prevents oxidation of the first and second electrodes 204, 205, thus ensuring holding of the meltable conductor. In the case that the short-circuit element 201 is mounted by reflow, this process will prevent the solder connecting the first and second meltable conductors 208, 209 or low melting point metal constituting an outer layer of the first and second meltable conductors 208, 209 from melting and eroding the first and second electrodes 204, 205 (solder erosion) to disconnect them.

Meltable Conductor

The first and second meltable conductors 208, 209 are formed from a low melting point metal, such as Pb free solder consisting essentially of Sn, capable of being promptly melted by a heat of the first and second heat-generating resistors 221, 222.

The first and second meltable conductors 208, 209 may also contain low melting point metal and high melting point metal. The low melting point metal is preferably a solder including Pb free solder and the high melting point metal is preferably Ag, Cu or an alloy consisting essentially of these, among others. By containing the low melting point metal and high melting point metal, in the case that the short-circuit element 201 is mounted by reflow, even if even if the low melting point metal is melted by the reflow temperature exceeding the melting point of the low melting point metal layer, the first and second meltable conductors 208, 209 are not interrupted. These first and second meltable conductors 208, 209 may be formed by depositing a low melting point metal onto a high melting point metal by using a plating method or may be formed by using another laminating method or film-forming method. It should be noted that the first and second meltable conductors 208, 209 can be solder connected to the first and third electrodes 204 and 206 or to second, fourth and fifth electrodes 205, 207 and 231 by using a low melting point metal constituting the outer layer.

Alternatively, the first and second meltable conductors 208, 209 may have an inner low melting point metal layer and an outer high melting point metal layer. By using meltable conductors in which the entire surface of the inner low melting point metal layer is covered with the outer high melting point metal layer, even if the melting point of the low melting point metal is lower than reflow temperature, the low melting point metal of the inner layer will not flow out during reflow mounting. Furthermore, in the case of blowout, the low melting point metal of the inner layer melts and erodes the high melting point metal of the outer layer (solder erosion), thus achieving prompt blowout.

Alternatively, the first and second meltable conductors 208, 209 may have a coated structure in which the high melting point metal constitutes an inner layer and the low melting point metal constitutes an outer layer. By using meltable conductors in which the entire surface of the inner high melting point metal layer is covered with the outer low melting point metal layer, the meltable conductors can be connected to electrodes via the outer low melting point metal layer and, in the case of blowout, the low melting point metal melts and erodes the high melting point metal, thus achieving prompt blowout.

Alternatively, the first and second meltable conductors 208 and 209 may have a laminated structure in which the low melting point metal and the high melting point metal are laminated. Alternatively, the first and second meltable conductors 208 and 209 may have a multi-layered structure having four or more layers in which the low melting point metal and the high melting point metal are alternately laminated. Alternatively, the first and second meltable conductors 208 and 209 may have a stripe-shaped structure in which the high melting point metal is laminated on a surface of the low melting point metal so as to form a stripe pattern. These structures can also reduce the time of erosion/melting of the high melting point metal by the low melting point metal.

Alternatively, the first and second meltable conductors 208 and 209 may constitute of a high melting point metal having a plurality of openings and a low melting point metal inserted in the openings. This structure increases the area of the high melting point metal layer contacting the melting low melting point metal layer and thus reduces the time in which the low melting point metal layer erodes the high melting point metal layer. It is, therefore, possible to promptly and surely blow the meltable conductor.

In addition, in the first and second meltable conductors 208 and 209, the volume of the low melting point metal preferably is larger than that of the high melting point metal. This can reduce the time of blowout wherein the high melting point metal layer is effectively eroded by the first and second meltable conductors 208, 209.

It should be noted that a flux 215 is applied on the first and second meltable conductors 208, 209 in order to prevent oxidation of the first and second meltable conductors 208, 209 and to improve wettability of the first and second meltable conductors 208, 209 during melting.

The insulating substrate 202 of the short-circuit element 201 is covered by a covering member 210 for internal protection. The covering member 210 includes a side wall 216 constituting a side surface of the short-circuit element 201 and a ceiling 217 constituting a top surface of the short-circuit element 201, the side wall 216 being connected onto the insulating substrate 202 to form a lid member which covers and closes the internal portion of the short-circuit element 201. Similarly to the insulating substrate 202, this covering member 210 is formed of an insulating material such as thermoplastic material, ceramics and glass epoxy substrate Additionally, the covering member 210 may have a covering member electrode 218 formed on the inner surface of the ceiling 217. The covering member electrode 218 is formed at a position overlapping the first and second electrodes 204, 205. This covering member electrode 218 can increase meltable conductor holding capacity because, when the first and second meltable conductors 208, 209 are melted by heat generated by the first and second heat-generating resistors 221, 222, the meltable conductors gathering on the first and second electrodes 204, 205 contact each other and wet-spread.

Short-Circuit Element Circuit

Figure 2:
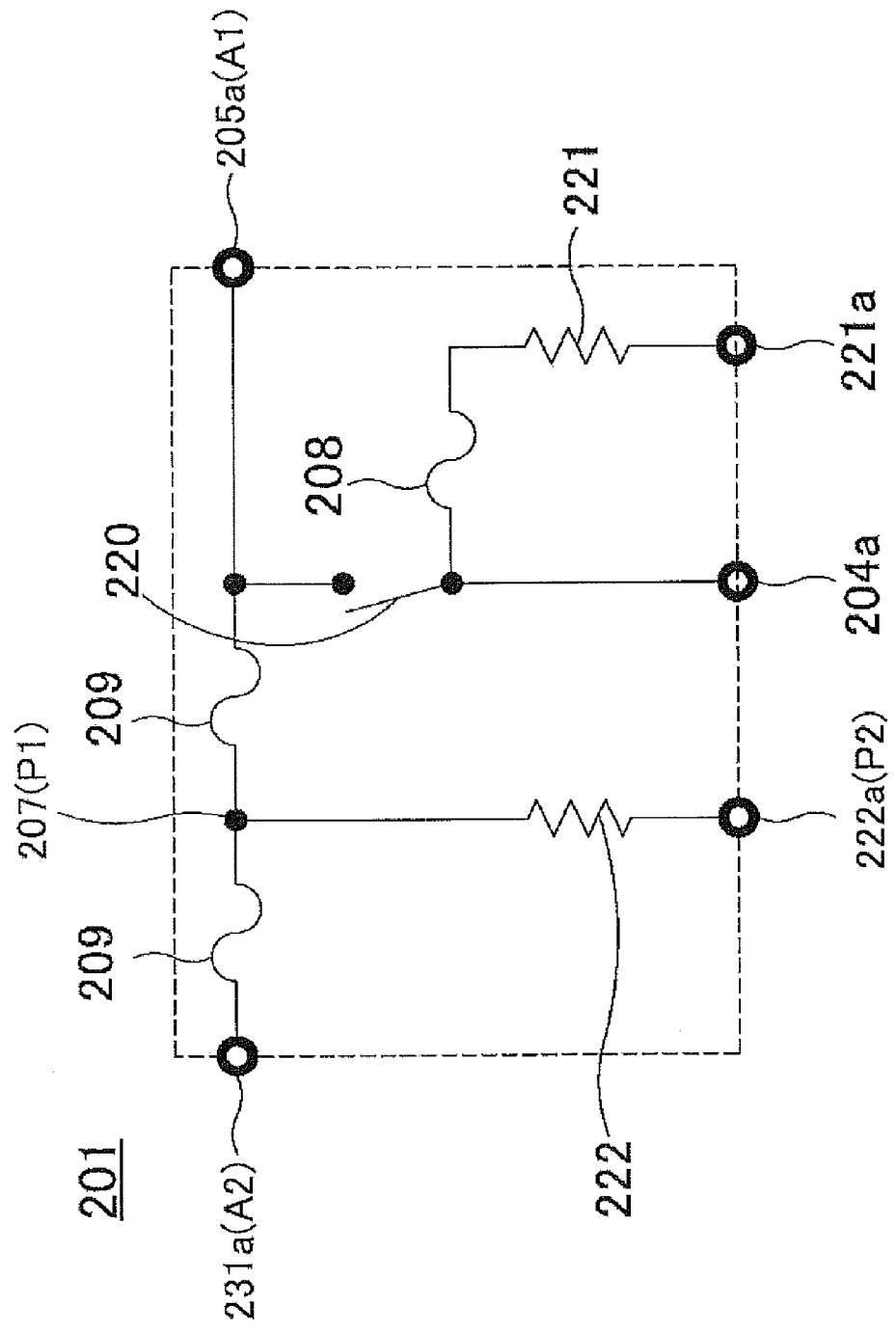
FIG. 2 is a circuit diagram of a short-circuit element.

The above-described short-circuit element 201 has a circuit arrangement shown in FIG. 2. That is, the short-circuit element 201 constitutes a switch 220 in which the first electrode 204 and the second electrode 205 are normally isolated and when the first and second meltable conductors 208, 209 are melted by a heat generated by the first and second heat-generating resistors 221, 222, the first electrode 204 and the second electrode 205 are short-circuited via the melted conductor. The first electrode terminal 204a and the second electrode terminal 205a constitute both terminals of the switch 220.

The first meltable conductor 208 is connected to the first heat-generating resistor 221 via a third electrode 206 and a first heat-generating element extracting electrode 223. Similarly, the second meltable conductor 209 is connected to the second heat-generating resistor 222 and second resistor terminal 222a (P2) via a fourth electrode 207 (P1) and second heat-generating element extracting electrode 224. Thus the second electrode 205 (A1) fourth electrode 207 (P1) and the fifth electrode 231 (A2) connected to the second meltable conductor 209 function as a protective element.

Figure 3:
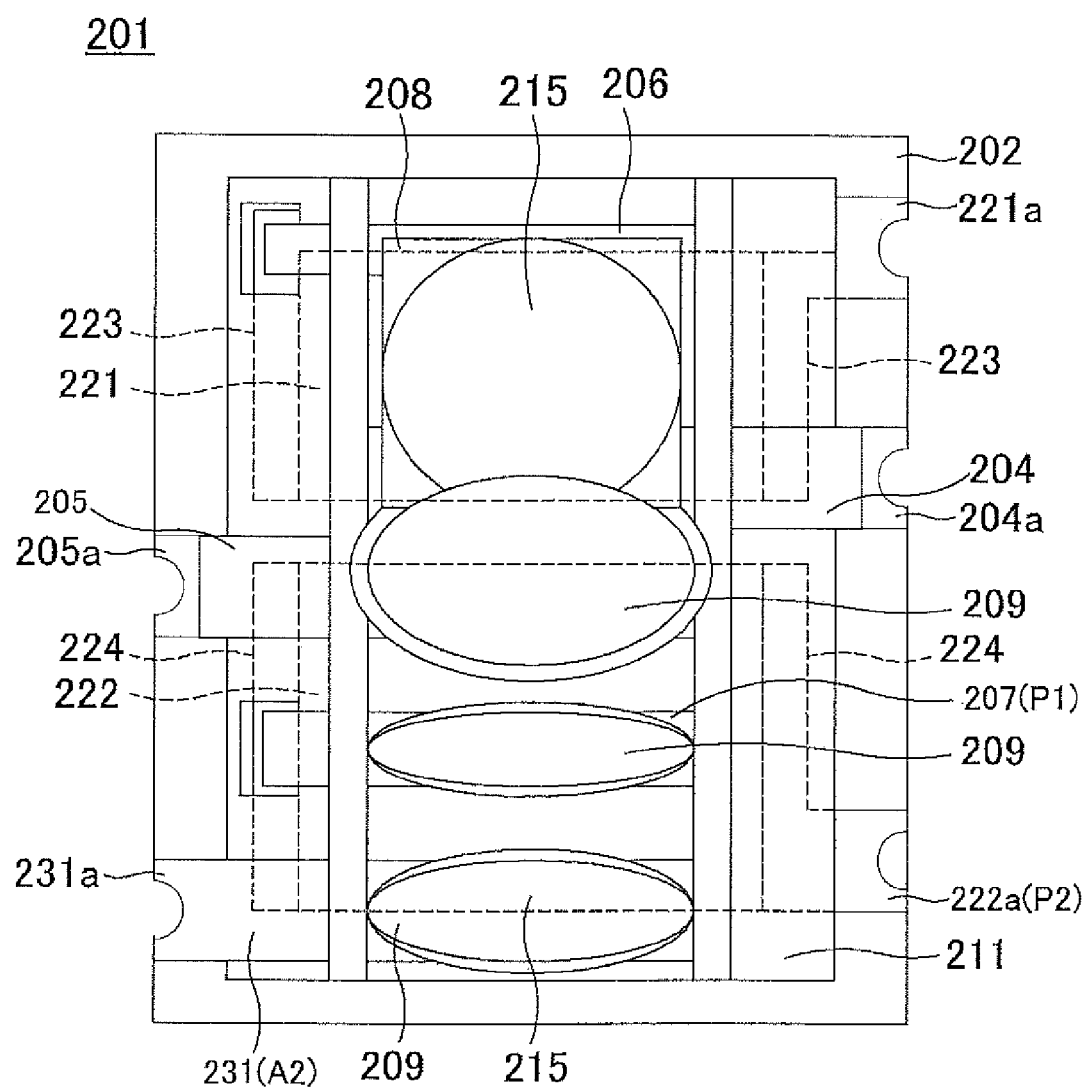
FIG. 3 is a plan view of a short-circuit element illustrating a state in which a second meltable conductor is melted antecedently.
Figure 4A:
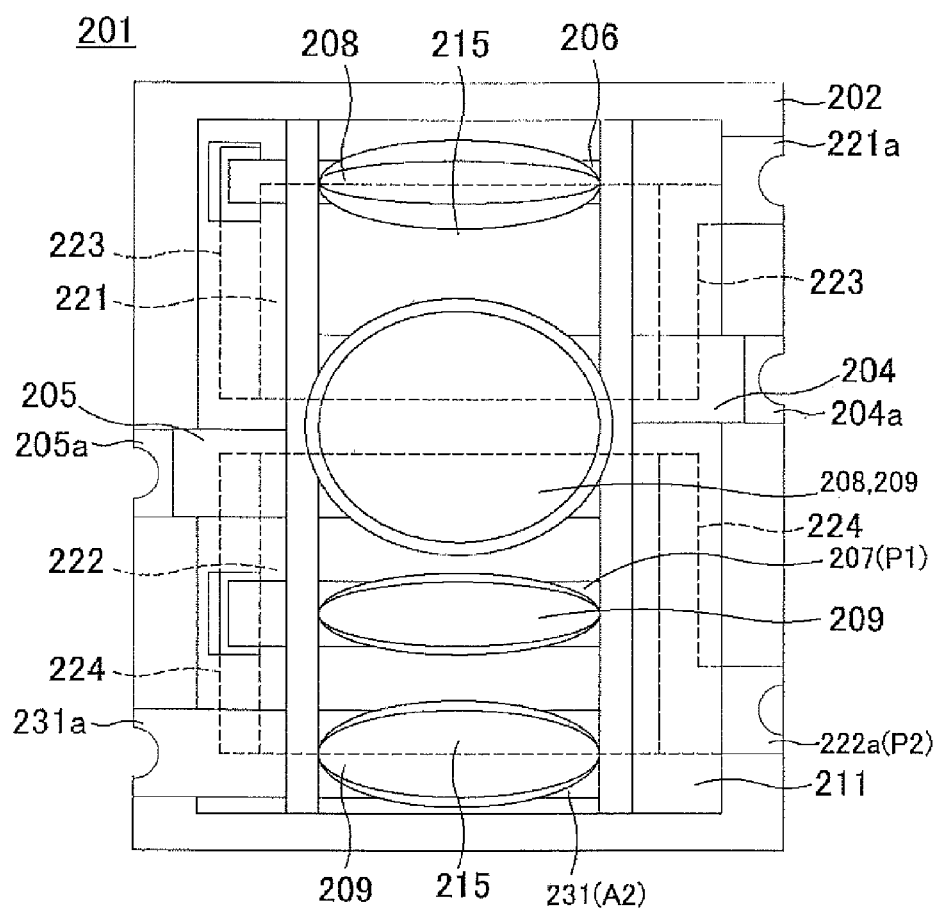
FIG. 4(A) is a plan view of a short-circuit element in which normally-isolated first and second electrodes are short-circuited by a meltable conductor and FIG. 4(B) is a cross-sectional view of the same.
Figure 4B:
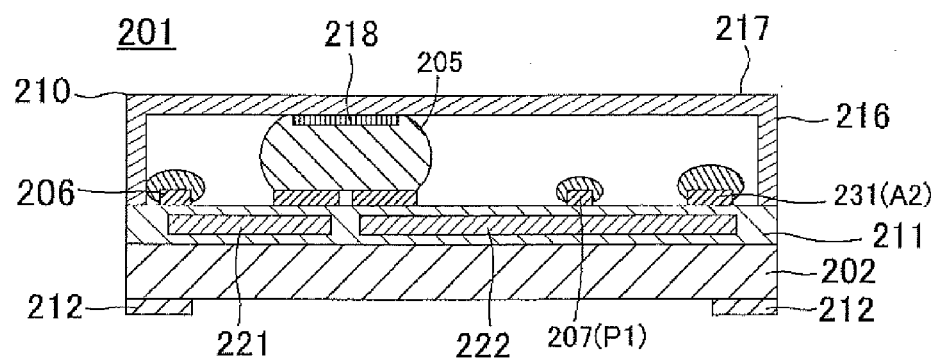

As shown in FIG. 3, in the short-circuit element 201, when power is supplied to the second resistor terminal 222a (P2), the second heat-generating resistor 222 generates heat to melt the second meltable conductor 209 to interrupt the current path connected between the second electrode 205 (A1) and the fifth electrode 231 (A2) via the fourth electrode 207 (P1). Furthermore, in the short-circuit element 201, when power is supplied to the first resistor terminal 221a, the first heat-generating resistor 221 generates heat to melt the first meltable conductor 208. In the short-circuit element 201, as shown in FIGS. 4(A) and 4(B), the melted conductor of the first and second meltable conductors 208, 209, which gathers and combines on the first electrode 204 and the second electrode 205, can short-circuit the normally isolated first electrode 204 and the second electrode 205, in other words, can short-circuit the switch 220.

It should be noted that the current flowing through the first heat-generating resistor 221 is interrupted since the first and third electrodes 204, 206 are disconnected when the first meltable conductor 208 blows, and that the current flowing through the second heat-generating resistor 222 is interrupted since the second and fourth electrodes 205, 207 and the fourth and fifth electrodes 207, 231 are disconnected when the second meltable conductor 109 blows.

Antecedent Melting of Second Meltable Conductor

In the short-circuit element 201, it is preferable for the second meltable conductor 209 to melt prior to the first meltable conductor 208. In the short-circuit element 201, since the first heat-generating resistor 221 and the second heat-generating resistor 222 separately generate heat, heating the second heat-generating resistor 222 prior to the first heat-generating resistor 221 by adjusting the timing of power supply, the second meltable conductor 209 can be melted prior to the first meltable conductor 208 easily as shown in FIG. 3, and the meltable conductor of the first and second meltable conductors 208, 209 can gather and combine on the first and second electrodes 204, 205, thus ensuring short-circuiting of the first and second electrodes 204, 205, as shown in FIGS. 4(A)-4(B).

The second meltable conductor 209 of the short-circuit element 201 may be formed to be narrower than the first meltable conductor 208, such that the second meltable conductor 209 melts prior to the first meltable conductor 208. The second meltable conductor 209 formed to be narrower reduces the melting time, thus enabling the second meltable conductor 209 to melt prior to the first meltable conductor 208.

Electrode Area

In addition, in the short-circuit element 201, the area of the first electrode 204 is preferably larger than that of the third electrode 206, and the area of the second electrode 205 is preferably larger than that of the fourth and fifth electrodes 207, 231. Since the meltable conductor capacity is proportional to the electrode area, by forming the first and second electrodes 204, 205 to be larger than the third, fourth and fifth electrodes 206, 207 and 231 a larger amount of meltable conductor can gather on the first and second electrodes 204, 205, thus ensuring short-circuiting of the first and second electrodes 204, 205.

Alternative Example of Short-Circuit Element

Figure 5:
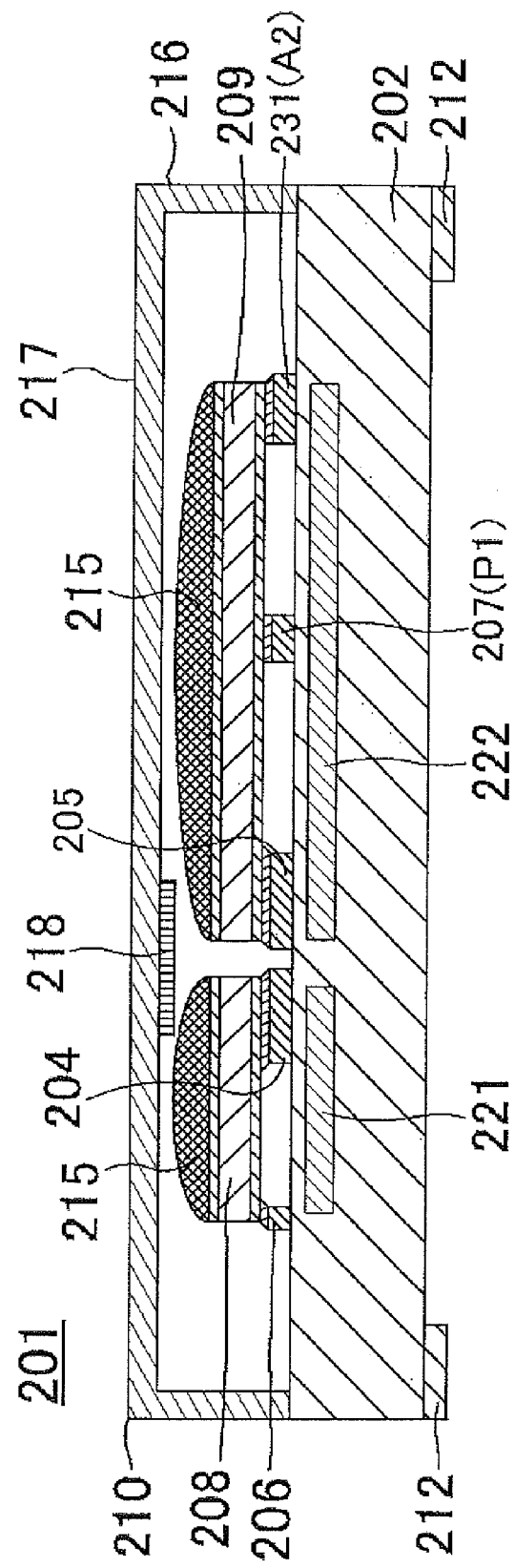
FIG. 5 is a cross-sectional view of an alternative embodiment of the short-circuit element.

In the short-circuit element 201, the first and second heat-generating resistors 221, 222 are not necessarily covered with the insulating layer 211 and the first and second heat-generating resistors 221, 222 may be disposed within the insulating substrate 202 as shown in FIG. 5. By using a material having an excellent heat-conductivity for the insulating substrate 202, the first and second heat-generating resistors 221, 222 can be heated to the same extent/degree as when heating via the insulating layer 211 made from such materials as glass.

Figure 6:
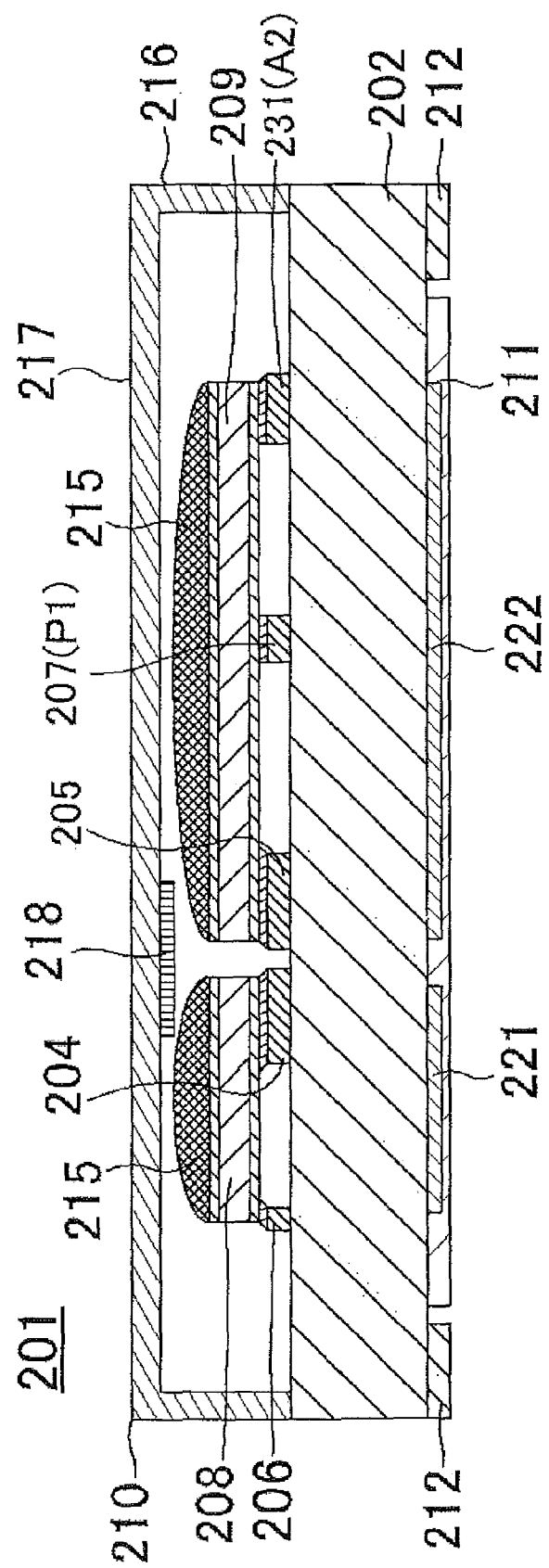
FIG. 6 is a cross-sectional view of an alternative embodiment of the short-circuit element.

Moreover, in the short-circuit element 201, the first and second heat-generating resistors 221, 222 may be formed on the back surface of the insulating substrate 202 opposing the surface on which the first to fifth electrodes 204, 205, 206, 207 and 231 are formed, as shown in FIG. 6. By forming the first and second heat-generating resistors 221, 222 on the back surface of the insulating substrate 202, the forming process can be simplified relative to the case of forming them within the insulating substrate 202. In this case, forming the insulating layer 211 on the first and second heat-generating resistors 221, 222 is preferable so as to protect the resistor and ensure insulation after mounting.

Figure 7:
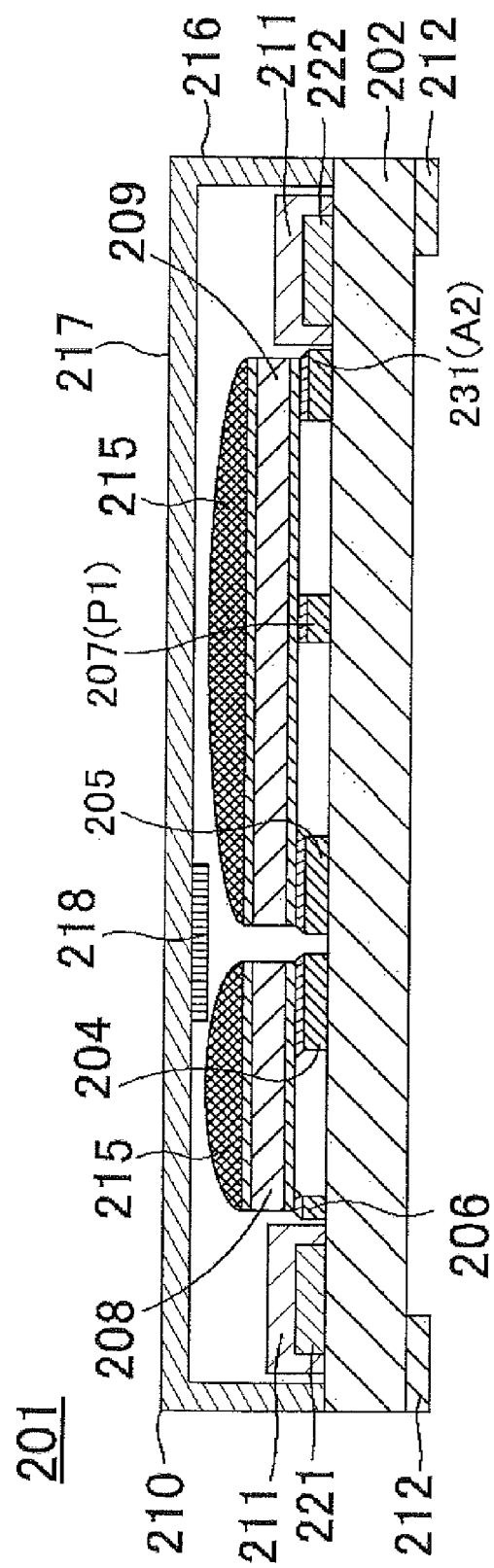
FIG. 7 is a cross-sectional view of an alternative embodiment of the short-circuit element.

In addition, as shown in FIG. 7, the first and second heat-generating resistors 221, 222 of the short-circuit element 201 may be formed on the surface of the insulating substrate 202 on which the first to fifth electrodes 204, 205, 206, 207 and 231 are formed. By forming the first and second heat-generating resistors 221, 222 on this surface of the insulating substrate 202, the forming process can be simplified compared to the case of forming them within the insulating substrate 202. In this case, forming the insulating layer 211 on the first and second heat-generating resistors 221, 222 is also preferable.

In addition, a protective resistor may be provided which is connected to one of the first electrode 204 and the second electrode 205. The protective resistor has a resistance corresponding to an internal resistance of the electronic component connected to the short-circuit elements and lower than the resistance of the first and second heat-generating resistors 221, 222. Current thus flows through the electronic component rather than through the short-circuit element during normal operation of the electronic component.

Figure 8A:
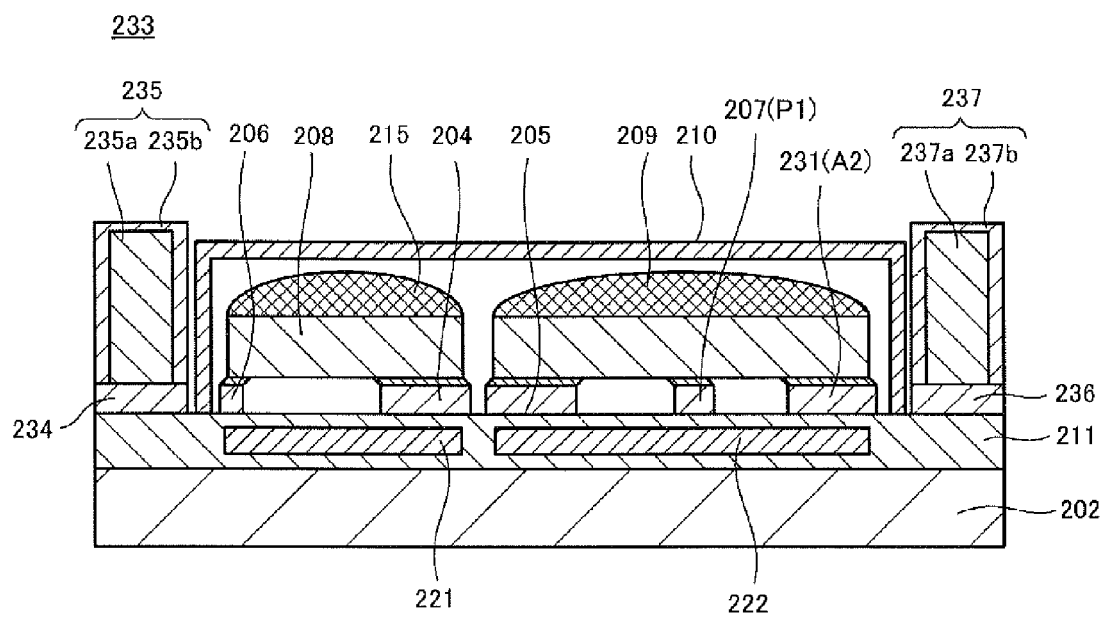
FIG. 8(A) shows a short-circuit element according to the present invention before melting of the meltable conductor and FIG. 8(B) shows the same but after melting of the meltable conductor.

In addition to forming the external terminal 212 connected to the first and second electrodes 204, 205 via the through hole on the back surface of the insulating substrate 202, as is the case of the short-circuit element 233 shown in FIGS. 8(A) and (B), the short-circuit element according to the present invention may have, on the surface of the insulating substrate 202 on which the first and second electrodes 204, 205 are formed, a first external connecting electrode 234 continuous with the first electrode 204, one of more first external connecting terminals 235 provided on the first external connecting electrode 234, a second external connecting electrode 236 continuous with the second electrode 205, and one or more of the second external connecting terminals 237 provided on the second external connecting electrode 236.

The first and second external connecting electrodes 234, 236 are electrodes for connecting the short-circuit element 233 to the electronic appliance to which the short-circuit element 233 is incorporated, the first external connecting electrode 234 being continuous with first electrode 204 and the second external connecting electrode 236 being continuous with the second electrode 205.

Figure 8B:
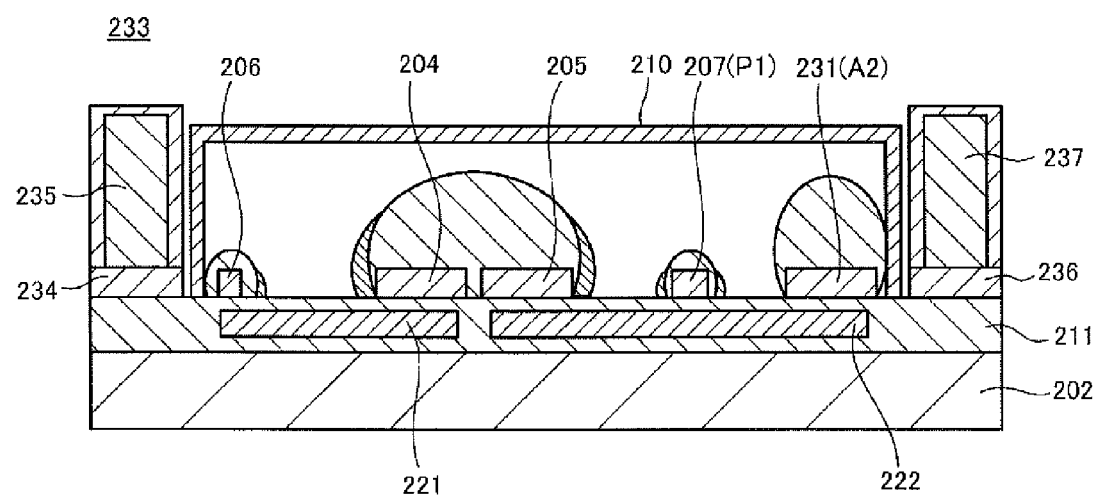

The first and second external connecting electrodes 234, 236 are made of a normal electrode material such as Cu and Ag, and formed on the surface of the insulating substrate 202 on which the first and second electrodes 204, 205 are formed. That is, as shown in FIGS. 8(A) and 8(B), the surface of the short-circuit element 233 on which the first and second meltable conductors 208, 209 are provided will be the mounting surface. It should be noted that the first and second external connecting electrodes 234, 236 can be formed simultaneously with the first and second electrodes 204, 205.

The first external connecting electrode 234 includes a first external connecting terminal 235 formed thereon. Similarly, the second external connecting electrode 236 includes a second external connecting terminal 237 formed thereon. These first and second external connecting terminals 235, 237 are connecting terminals for mounting the short-circuit element onto the electronic appliance and are formed by using a metal bump or metal post. In addition, as shown in FIG. 8(A), the first and second external connecting terminals 235, 237 have a height exceeding the covering member 210 provided over the insulating substrate 202 and are mountable to a substrate constituting the mounting target of the short-circuit element 233.

It should be noted that the first heat-generating resistor 221 of the short-circuit element 233 includes a resistor connecting terminal 221b formed on the first heat-generating element extracting electrode 223 and the resistor terminal 221a. On the other hand the second heat-generating resistor 222 of the short-circuit element 233 includes a resistor connecting terminal 222b formed on the second heat-generating element extracting electrode 224 and the second resistor terminal 222a. In addition, the fifth electrode 231 includes a third external connecting terminal 231b formed on a fifth electrode terminal 231a. The first and second resistor connecting terminals 221b, 222b are formed by using a metal bump or metal post similarly to the first and second external connecting terminals 235, 237, and protrude upward from the insulating layer 211.

Although the external terminal 212 of the short-circuit element 201 is formed on the back surface of the insulating substrate 202 and is connected to the first and second electrodes 204, 205 via the through hole, the external connecting terminals 235, 237 of the short-circuit element 233 are formed, via the first and second external connecting electrodes 234, 236, on the surface on which the first and second electrodes 204, 205 are formed. In the short-circuit element 233 shown in FIG. 8(B), the combined resistance of the first external connecting terminal 235 and the second external connecting terminal 237 is lower than the conduction resistance between the first and second external connecting electrodes 234, 236 when the first electrode 204 and the second electrode 205 are short-circuited.

This increases the rated current of the short-circuit element 233 when the first and second electrodes 204, 205 are short-circuited and form a bypass current path such that the short-circuit element 233 can accommodate a large current. Further increase of the rated current of the short-circuit element is desired in large current applications of lithium ion secondary batteries used for a power source of HEVs or EVs. The conduction resistance between the first and second external connecting electrodes 234, 236 short-circuited by the meltable conductor can be reduced to a value (for example, 0.4 mΩ or less) sufficient to increase the rated current.

However, in the short-circuit element 201, in which the external terminal 212 is formed on the back surface of the insulating substrate 202 and connected to the first and second electrodes 204, 205 via the through hole, the conduction resistance between the first and second electrodes 204, 205 and the external terminal 212 is high (for example, 0.5 to 1.0 mΩ), such that reduction of the entire conduction resistance is limited even if the through hole is filled with a conductor.

In addition, large current flowing between the first and second electrodes 204, 205 and the external terminal 212 having a high-resistance generates a heat, which might damage the bypass current path and might thermally affect other peripheral devices.

On the other hand, the external connecting terminals 235, 237 of the short-circuit element 233 are formed on the surface on which the first and second electrodes 204, 205 are formed. The shape and size of the external connecting terminals 235, 237, which are formed on the external connecting electrodes 234, 236, can be designed flexibly, such that terminals having low conduction resistance can be achieved. In the short-circuit element 233, the combined resistance of the first external connecting terminal 235 and the second external connecting terminal 237 is lower than the conduction resistance between the first and second external connecting electrodes 234, 236 when the first electrode 204 and the second electrode 205 are short-circuited.

Consequently, the short-circuit element 233 can easily reduce the conduction resistance beyond the first and second external connecting electrodes 234, 236, which must be high in the case of the short-circuit element 201, thus remarkably improving the current rating.

The first and second external connecting terminals 232, 234 may be formed by using a metal bump or metal post made of Pb free solder consisting essentially of Sn. Any shape of metal bump or metal post may be used. The resistances of the first and second external connecting terminals 235, 237 are determined by the material, shape and size. For example, in the case of a rectangular metal post having a Cu core coated with a solder (Cu core: 0.6 mm×0.6 mm, cross-sectional area: 0.36 mm$^2$, height: 1 mm, specific resistance: 17.2 μΩ·mm), the resistance of the Cu core of the terminal is approximately 0.048 mΩ and, by taking account of the solder coating, the resistance between the serially connected first and second external connecting terminals 235, 237 is 0.096 mΩ or less, which is sufficiently low to improve the entire rating of the short-circuit element 233.

It should be noted that the conduction resistance between the short-circuited first and second external connecting electrodes 234, 236 of the short-circuit element 233 can be determined by calculating the total resistance of the entire device from the resistance between the short-circuited first and second external connecting terminals 235, 237, and calculating the difference between this total resistance and the known combined resistance of the first and second external connecting terminals 235, 237. The combined resistance of the first and second external connecting terminals 235, 237 of the short-circuit element 233 can be determined by the difference between the measured resistance of the short-circuited first and second external connecting electrodes 234, 236 and the total resistance of the entire device during the short-circuit.

Figure 9:
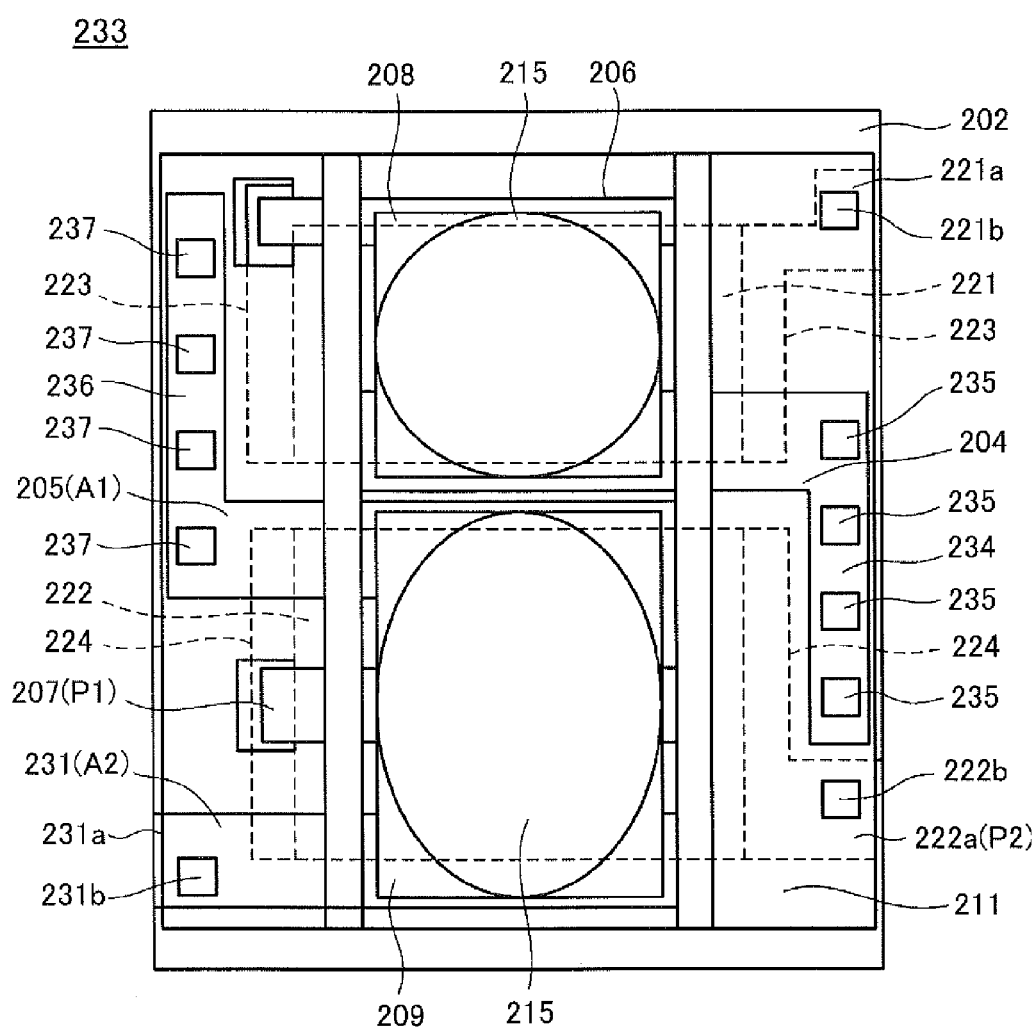
FIG. 9 is a plan view of another short-circuit element according to the present invention.

Furthermore, the conduction resistance of the short-circuit element 233 may be reduced by widening the first and second external connecting electrodes 234, 236 with a rectangular shape, for example, and providing a plurality of the first and second external connecting terminals 235, 237, as shown in FIG. 9. Alternatively, the conduction resistance of the short-circuit element 233 may be reduced by providing the first and second external connecting terminals 235, 237 having a larger diameter on the widened first and second external connecting electrodes 234, 236.

In addition, the first and second external connecting terminals 235, 237 may be formed by coating high melting point metal cores 235a, 237a with low melting point metal layers 235b, 237b. The preferable metal constituting the low melting point metal layer 235b, 237b may be a Pb free solder consisting essentially of Sn, and the high melting point metal 235a, 237a may be an alloy consisting essentially of Cu or Ag.

By coating the high melting point metal 235a, 237a with the low melting point metal layer 235b, 237b, in the case that the short-circuit element 233 is mounted by reflow, even if even if the low melting point metal is melted by the reflow temperature exceeding the melting point of the low melting point metal layer 235b, 237b, the first and second external connecting terminals 235, 237 will not melt. In addition, the first and second external connecting terminals 235, 237 can be connected to the first and second external connecting electrodes 234, 236 by using the low melting point metal constituting the outer layer.

The first and second external connecting terminals 235, 237 can be formed by depositing the low melting point metal onto the high melting point metal 235a, 237a by using a plating method or may be formed by using another conventional laminating method or film forming method.

In addition to forming the first and second external connecting terminals 235, 237 by using a metal bump or metal post, they can be formed as conductive plating layers or conductive layers formed by applying a conductive paste.

The first and second external connecting terminals 235, 237 may be provided in advance on a mounting target onto which the short-circuit element 233 is to be mounted, such that the first and second external connecting electrodes 234, 236 are connected to the short-circuit element on a mounting member on which the short-circuit element is mounted.

Circuit Arrangement of Battery Pack

Figure 10A:
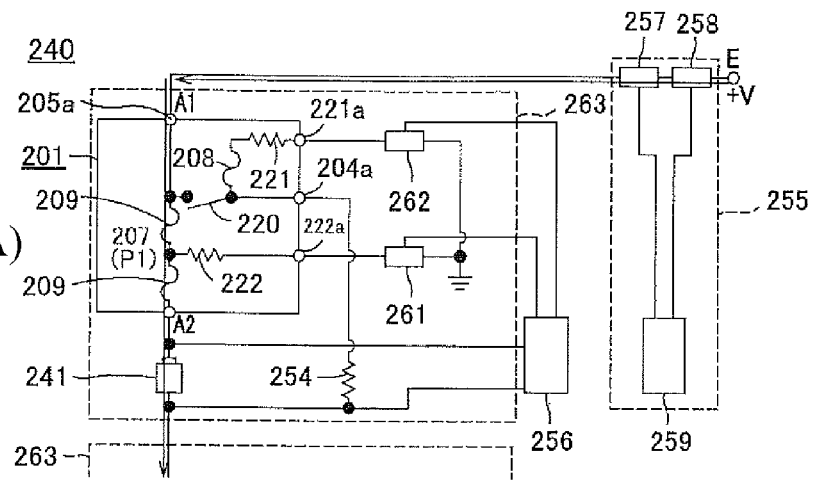
FIG. 10(A) is a circuit diagram of an battery pack using a short-circuit element in a normal state.
Figure 10B:
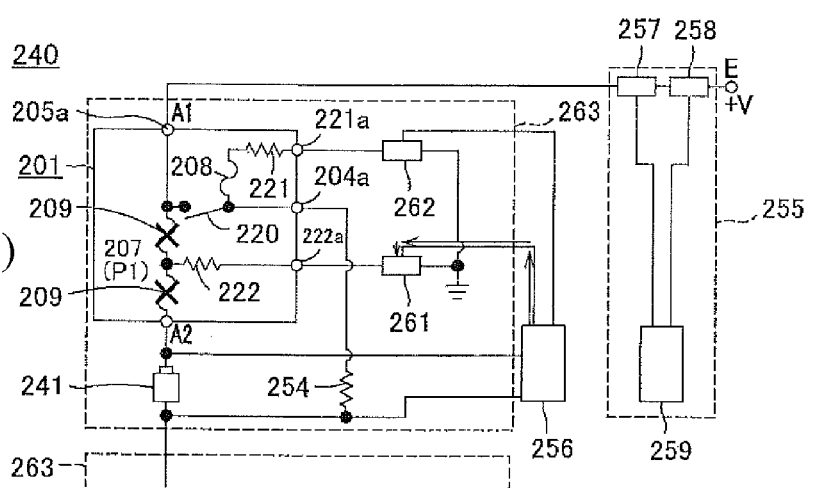
FIG. 10(B) is a circuit diagram of the same in an abnormal state.
Figure 10C:
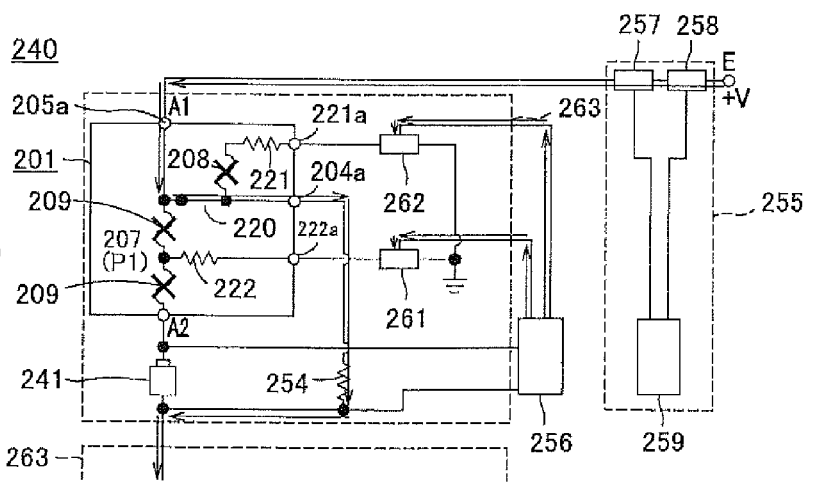
FIG. 10(C) is a circuit diagram of the same in a state in which a bypass current path is formed.

A circuit arrangement of an electronic appliance incorporating the short-circuit element 201 will be explained below. FIGS. 10(A)-10(C) show a circuit arrangement of a battery pack 240 incorporating a lithium ion battery installed in and used for various electronic appliances including vehicles and electric power tools. As shown in FIG. 10(A), the battery pack 240 includes a plurality of battery units 263 each having a battery cell 241, a short-circuit element 201, a first and second current controlling element 261, 262 for controlling the operation of the short-circuit element 201, and a protective resistor 254, and these battery units 263 are connected in series.

In addition, the battery pack 240 includes a battery unit 263, a charging/discharging controlling circuit 255 for controlling the charging/discharging of the battery unit 263, and a detecting circuit 256 for detecting the voltage of the battery cell 241 of each battery unit 263 and outputting an abnormal signal to the first and second current controlling elements 261, 262 which control the operation of the short-circuit element 201. The charging/discharging controlling circuit 255 includes the third and fourth current controlling elements 257, 258 connected to the current path from the battery unit 263 to the charging device in series, and the controlling component 259 for controlling the operation of the current controlling elements 257, 258.

In each battery unit 263, the short-circuit element 201 is connected to the battery cell 241 in series by connecting the second electrode terminal 205a of the second electrode 205 (A1) of the short-circuit element 201 to the charging/discharging current path of the battery pack 240, and the fifth electrode terminal 231a of the fifth electrode 231 (A2) to the battery cell 41. Moreover in the battery unit 263, the second heat-generating resistor 222 is connected to the first current controlling element 261 via the second resistor terminal 222a (P2).

Furthermore, in battery unit 263, the switch 220 is bypassed from the charging/discharging current path of the battery cell 241 by connecting the first electrode terminal 204a of the first electrode 204 to the open end of the battery cell 241 via the protective resistor 254. The first heat-generating resistor 221 of the battery unit 263 is connected to the second current controlling element 262 via first resistor terminal 221a.

Furthermore, when an over-charging voltage or over-discharging voltage is detected in a battery cell 241, the detecting circuit 256 outputs an abnormal signal to the first and second current controlling elements 261, 262 of the battery unit 263 including the relevant battery cell 241.

When the detection signal output from the detecting circuit 256 indicates a voltage exceeding the predetermined threshold value corresponding to over-discharging or over-charging of the battery cell 241, the first and second current controlling elements 261, 262, which are formed, for example, of an FET control the short-circuit element 201 to interrupt the charging/discharging current path of the battery unit 263 without the switching operation of the third and fourth current controlling elements 257, 258, to short-circuit the switch 220 of the short-circuit element 201 to form a bypass current path which bypasses the relevant battery unit 263.

In normal operation of the battery pack 240, the switch 220 of the short-circuit element 201 is not short-circuited and the current flows through the battery cell 241 via the second meltable conductor 209, as shown in FIG. 10(A).

If an abnormal voltage is detected from the battery cell 241, the detecting circuit 256 outputs an abnormal signal to the first current controlling element 261 and the second heat-generating resistor 222 of the short-circuit element 201 generates heat. As shown in FIG. 10(B), the second heat-generating resistor 222 of the short-circuit element 201 heats and melts the second meltable conductor 209 to interrupt the connections between the second electrode 205 (A1) and the fourth electrode 207 (P1), and between the fourth electrode 207 (P1) and the fifth electrode 231 (A2). This can bypass the relevant battery unit 263 having the abnormal battery cell 241 from the charging/discharging current path of the battery pack 240, as shown in FIG. 10(B). It should be noted that the blowout of the second meltable conductor 209 interrupts the current supplied to the second heat-generating resistor 222.

Next, shortly after the output to the first current controlling element 261, the detecting circuit 256 of the battery pack 240 also outputs an abnormal signal to the second current controlling element 262 of the relevant battery unit 263 such that the first heat-generating resistor 221 of the short-circuit element 201 also generates heat. In the short-circuit element 201, the first heat-generating resistor 221 heats and melts the first meltable conductor 208 and the melted conductor of the first and second meltable conductors 208, 209 gathers and combines on the first electrode 204 and the second electrode 205. This short-circuits the normally isolated first electrode 204 and second electrode 205, and short-circuits the first electrode terminal 204a and second electrode terminal 205a of the switch 220. Consequently, as shown in FIG. 10(C), in the short-circuit element 201, a bypass current path bypassing the relevant battery unit 263 can be formed. It should be noted that the blowout of the first meltable conductors 208 interrupts the current supplied to the first heat-generating resistor 221.

It should be noted that setting the resistance of the protective resistor 254 to a value approximately the same as the internal resistance of the battery cell 241 can enable a bypass current having approximately the same as normal operating capacity.

In this battery pack 240, even if an abnormality occurs in one of the battery units 263, a bypass current path bypassing the damaged battery unit 263 can be formed to retain the charging/discharging function by the remaining normal battery units 263.

Short-Circuit Element (Incorporating Protective Resistor)

Figure 11:
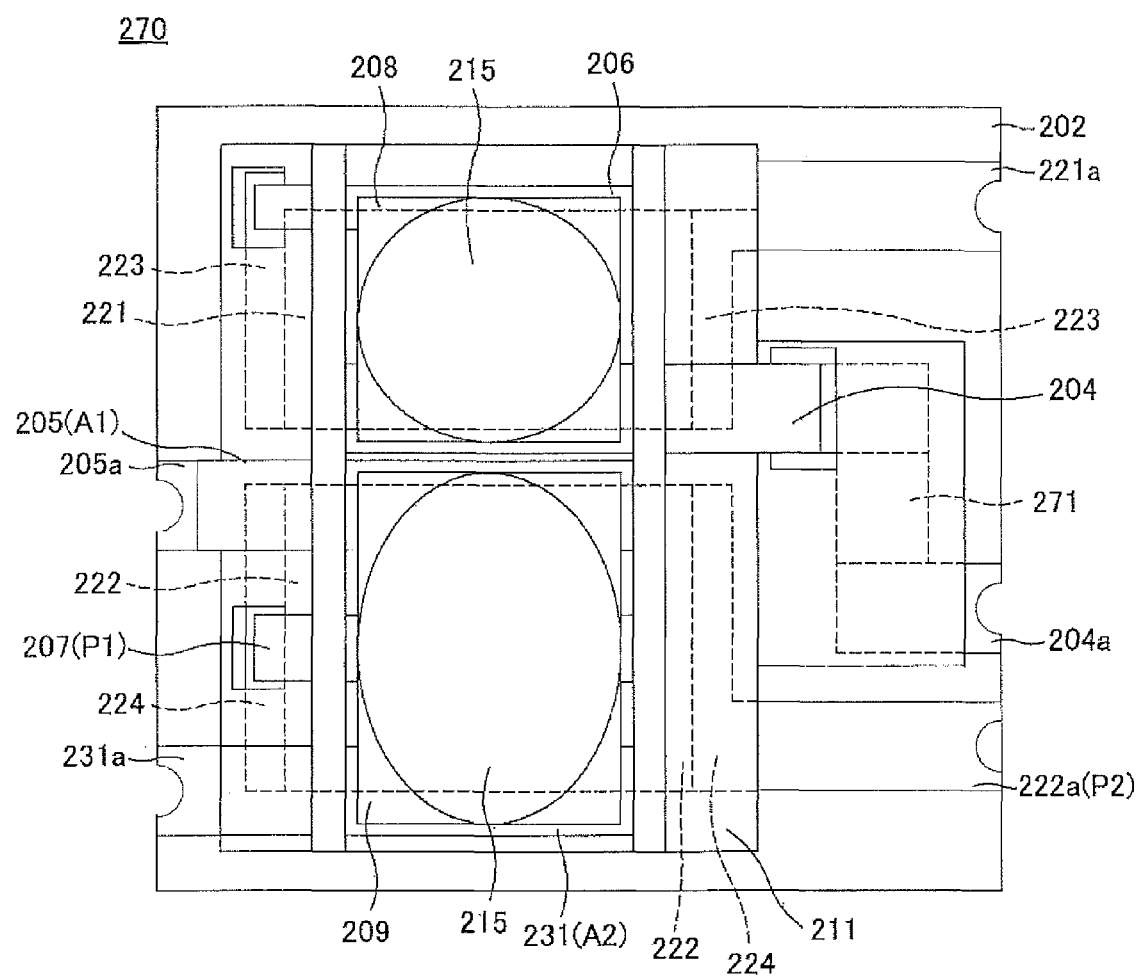
FIG. 11 is a plan view of a short-circuit element including a protective resistor.

A protective resistor may be incorporated into the short-circuit element in advance. FIG. 11 is a plan view of a short-circuit element 270 in which a protective resistor 271 is formed on the insulating substrate 202. In addition to the constitution of the above-described short-circuit element 201, in the short-circuit element 270, the protective resistor 271 is connected to the first electrode 204, and a first electrode terminal 204a is formed on this protective resistor 271. The protective resistor 271 can use the same material and be simultaneously formed with the same process as the heat-generating resistor 221, 222.

In the cases that the internal resistance of an electronic appliance or the battery pack is fixed and known, the short-circuit element 270 incorporating the protective resistor 271 in advance can be used to simplify processes such as mounting.

Figure 12:
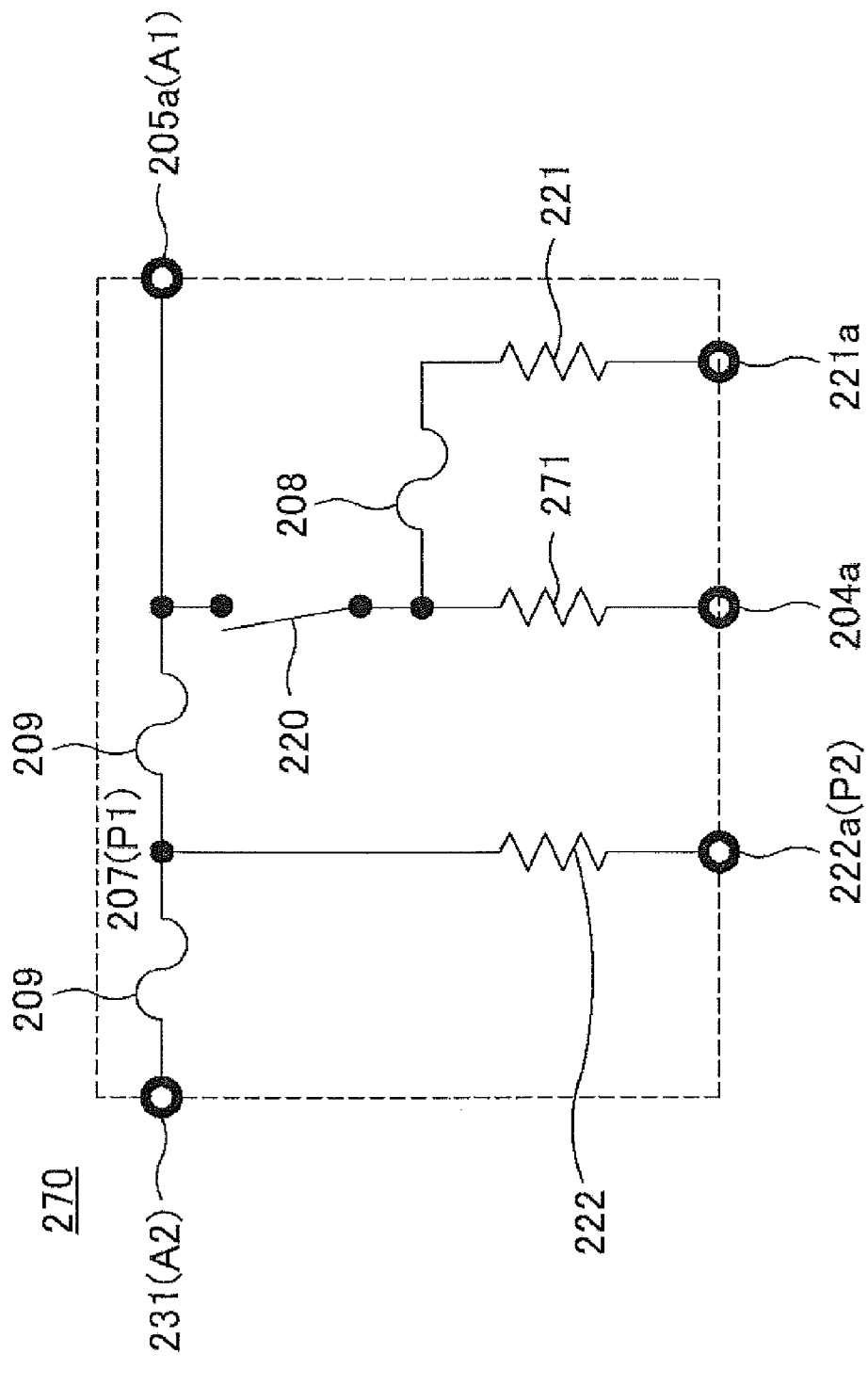
FIG. 12 is a circuit diagram of a short-circuit element including a protective resistor.
Figure 13:
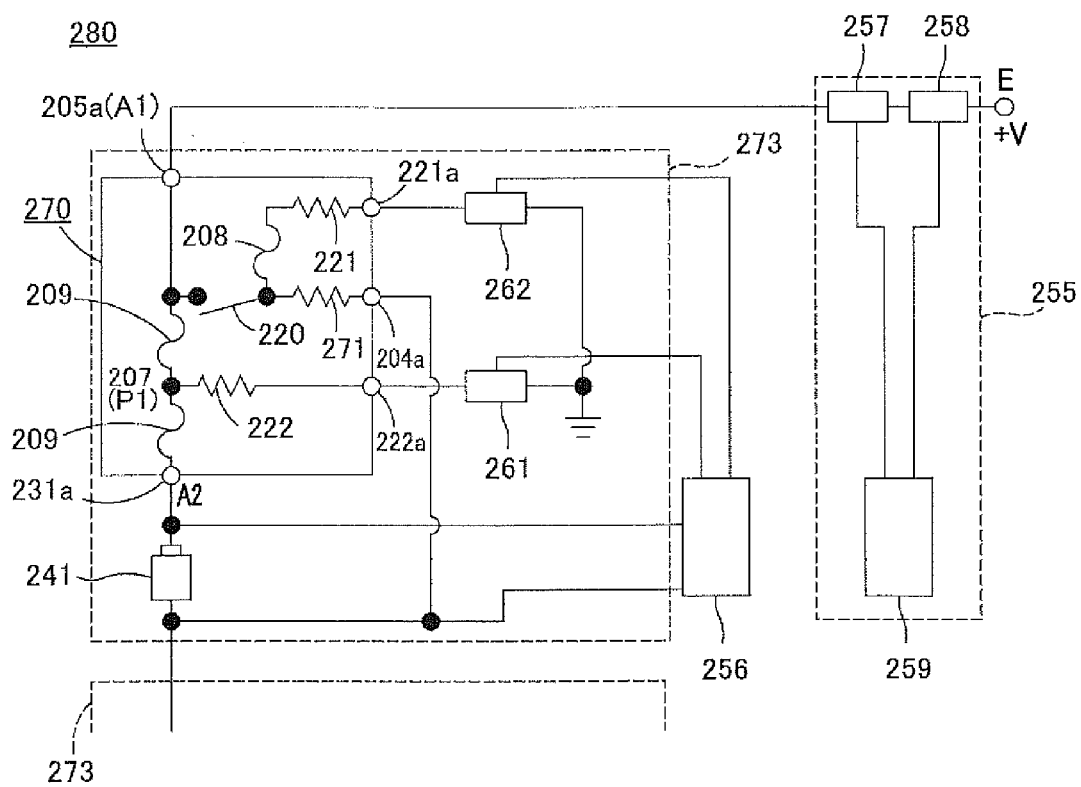
FIG. 13 is a circuit diagram of a battery pack using a short-circuit element including a protective resistor.

FIG. 12 illustrates a circuit arrangement of the short-circuit element 270. In this circuit arrangement of the short-circuit element 270, when the switch 220 is short-circuited, the first electrode terminal 204a and the second electrode terminal 205a are connected via the protective resistor 271. That is, the circuit arrangement of the short-circuit element 270 includes the first meltable conductor (fuse) 208, the first heat-generating resistor 221 connected to one end of the first meltable conductor 208, the switch 220 connected to the other end of the first meltable conductors 208 to which the first heat-generating resistor 221 is not connected, and the protective resistor 271 connected to at least one terminal of the switch 220, wherein the switch 220 is short-circuited in conjunction with melting of the first meltable conductor 208.

Similarly to the above-described short-circuit element 233, in the short-circuit element 270, other than forming the external terminal 212 on the back surface of the insulating substrate 202 and connecting the external terminal 212 to the first electrode terminal 204a and the second electrode terminal 205a via a through hole, the second external connecting electrode 236 continuous with the second electrode 205, and the second external connecting terminal 237 may be formed on the surface of the insulating substrate 202 to which the first and second electrodes 204, 205 are formed on the protective resistor 271.

Circuit Arrangement of Battery Pack (Incorporating Protective Resistor)

FIG. 12 shows a circuit arrangement of a battery pack 280 incorporating the short-circuit element 270. The circuit arrangement of the battery pack 280 is the same as the above-described battery pack 240 except that the short-circuit element 270 is used. That is, the battery pack 280 includes a plurality of battery units 273 each having the battery cell 241, the short-circuit element 270, the first and second current controlling element 261, 262 for controlling the short-circuit element 270, and these battery units 273 are connected in series. In the battery pack 280, the resistance of the protective resistor 271 of the short-circuit element 270 provided in each battery unit is almost the same as the internal resistance of the battery cell 241 of the relevant battery unit 273.

In this battery pack 280, even if an abnormality occurs in one of the battery units 273, a bypass current path bypassing the damaged battery unit 273 can be formed to retain the charging/discharging function by the remaining normal battery units 273. In this situation, since the resistance of the protective resistor 271 of the battery pack 280 is almost the same as the internal resistance of the battery cell 241, the current flowing through the bypass current path will be almost the same as the normal operating current.

REFERENCE SIGNS LIST 201 short-circuit element, 202 insulating substrate, 204 first electrode, 204a first electrode terminal, 205 second electrode, 205a second electrode terminal, 206 third electrode, 207 fourth electrode, 208 first meltable conductor, 209 second meltable conductor, 210 covering member, 211 insulating layer, 212 external terminal, 215 flux, 218 covering member electrode, 220 switch, 221 first heat-generating resistor, 221a first resistor terminal, 221b first resistor connecting terminal, 222 second heat-generating resistor, 222a second resistor terminal, 222b second resistor connecting terminal, 223 first heat-generating element extracting electrode, 224 second heat-generating element extracting electrode, 231 fifth electrode, 231a fifth electrode terminal, 231b third external connecting terminal, 233 short-circuit element, 234 first external connecting electrode, 235 first external connecting terminal, 236 second external connecting electrode, 237 second external connecting terminal, 240 battery pack, 241 battery cell, 254 protective resistor, 255 charging/discharging controlling circuit, 256 detecting circuit, 257 third current controlling element, 258 fourth current controlling element, 259 controlling component, 261 first current controlling element, 262 second current controlling element, 263 battery unit, 270 short-circuit element, 271 protective resistor, 273 battery unit, 280 battery pack

The invention claimed is:
1. A short-circuit element comprising:
an insulating substrate;
a first and a second heat-generating resistors formed on the insulating substrate;

a first and a second electrodes arranged adjacently to each other on the insulating substrate;

a third electrode arranged adjacently to the first electrode on the insulating substrate and electrically connected to the first heat-generating resistor;

a fourth electrode arranged adjacently to the second electrode on the insulating substrate and electrically connected to the second heat-generating resistor;

a fifth electrode arranged adjacently to the fourth electrode;

a first meltable conductor arranged between the first and third electrodes to constitute a current path capable of being blown by a heat generated by the first heat-generating resistor; and a second meltable conductor arranged between the second and fifth electrodes through the fourth electrode to constitute a current path, in which the current path between the second and fourth electrodes and between the fourth and fifth electrodes are capable of being blown by a heat generated by the second heat-generating resistor, wherein the first and second meltable conductors are melted by the heat from the first and second heat-generating resistors and gather on the first and second electrodes to short-circuit the first and second electrodes.

2. The short-circuit element according to claim 1, wherein the second meltable conductor is blown prior to the first meltable conductor.

3. The short-circuit element according to claim 2 further comprising an insulating layer laminated on the insulating substrate, wherein the first to fifth electrodes are arranged on the insulating layer; and wherein the first and second heat-generating resistors are disposed within the insulating layer or between the insulating layer and the insulating substrate.

4. The short-circuit element according to claim 2, wherein the first and second heat-generating resistors are disposed within the insulating substrate.

5. The short-circuit element according to claim 2, wherein the first and second heat-generating resistors are disposed on a surface of the insulating substrate opposite to an electrode-forming surface.

6. The short-circuit element according to claim 2, wherein the first and second heat-generating resistors are disposed on an electrode-forming surface of the insulating substrate.

7. The short-circuit element according to claim 2, wherein surfaces of the first electrode and the second electrode are coated with one of Ni/Au plating, Ni/Pd plating and Ni/Pd/Au plating.

8. The short-circuit element according to claim 2, wherein the first electrode has an area wider than that of the third electrode, and the second electrode has an area wider than those of the fourth and fifth electrodes.

9. The short-circuit element according to claim 2 further comprising:

a covering member arranged on the insulating substrate for internal protection; and a covering member electrode arranged on an inner surface of the covering member, wherein the covering member electrode is arranged at a position which overlaps the first electrode and the second electrode.

10. The short-circuit element according to claim 2 further comprising a protective resistor arranged on the insulating substrate and connected to one of the first electrode and the second electrode.

11. The short-circuit element according to claim 2, wherein at least one of the first and second meltable conductors are a Pb free solder consisting essentially of Sn.

12. The short-circuit element according to claim 2, wherein at least one of the first and second meltable conductors contains a low melting point metal and a high melting point metal, and wherein the low melting point metal is melted by a heat generated by the heat-generating resistor and erodes the high melting point metal.

13. The short-circuit element according to claim 2, wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and wherein a combined resistance of the first external connecting terminal and the second external connecting terminal is lower than a conduction resistance between the first and second external connecting electrodes when the first electrode and the second electrode are short-circuited.

14. The short-circuit element according to claim 13, wherein the external connecting terminal is one of a metal bump and a metal post.

15. The short-circuit element according to claim 14, wherein in the metal bump or metal post, a low melting point metal layer is formed on a high melting point metal surface.

16. The short-circuit element according to claim 15, wherein the high melting point metal consists essentially of copper or silver, and the low melting point metal is a lead-free solder consisting essentially of tin.

17. The short-circuit element according to claim 13, wherein the external connecting terminal is a metal bump made of a lead-free solder consisting essentially of tin.

18. The short-circuit element according to claim 2, wherein the second meltable conductor is narrower than the first meltable conductor.

19. The short-circuit element according to claim 18 further comprising an insulating layer laminated on the insulating substrate, wherein the first to fifth electrodes are arranged on the insulating layer; and wherein the first and second heat-generating resistors are disposed within the insulating layer or between the insulating layer and the insulating substrate.

20. The short-circuit element according to claim 18, wherein the first and second heat-generating resistors are disposed within the insulating substrate.

21. The short-circuit element according to claim 18, wherein the first and second heat-generating resistors are disposed on a surface of the insulating substrate opposite to an electrode-forming surface.

22. The short-circuit element according to claim 18, wherein the first and second heat-generating resistors are disposed on an electrode-forming surface of the insulating substrate.

23. The short-circuit element according to claim 18, wherein surfaces of the first electrode and the second electrode are coated with one of Ni/Au plating, Ni/Pd plating and Ni/Pd/Au plating.

24. The short-circuit element according to claim 18, wherein the first electrode has an area wider than that of the third electrode, and the second electrode has an area wider than those of the fourth and fifth electrodes.

25. The short-circuit element according to claim 18 further comprising:
a covering member arranged on the insulating substrate for internal protection; and
a covering member electrode arranged on an inner surface of the covering member,
wherein the covering member electrode is arranged at a position which overlaps the first electrode and the second electrode.

26. The short-circuit element according to claim 18 further comprising a protective resistor arranged on the insulating substrate and connected to one of the first electrode and the second electrode.

27. The short-circuit element according to claim 18, wherein at least one of the first and second meltable conductors are a Pb free solder consisting essentially of Sn.

28. The short-circuit element according to claim 18,
wherein at least one of the first and second meltable conductors contains a low melting point metal and a high melting point metal, and
wherein the low melting point metal is melted by a heat generated by the heat-generating resistor and erodes the high melting point metal.

29. The short-circuit element according to claim 18, wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

30. The short-circuit element according to claim 29, wherein the external connecting terminal is one of a metal bump and a metal post.

31. The short-circuit element according to claim 30, wherein in the metal bump or metal post, a low melting point metal layer is formed on a high melting point metal surface.

32. The short-circuit element according to claim 31, wherein the high melting point metal consists essentially of copper or silver, and the low melting point metal is a lead-free solder consisting essentially of tin.

33. The short-circuit element according to claim 29, wherein the external connecting terminal is a metal bump made of a lead-free solder consisting essentially of tin.

34. The short-circuit element according to claim 1 further comprising an insulating layer laminated on the insulating substrate,
wherein the first to fifth electrodes are arranged on the insulating layer; and
wherein the first and second heat-generating resistors are disposed within the insulating layer or between the insulating layer and the insulating substrate.

35. The short-circuit element according to claim 1, wherein the first and second heat-generating resistors are disposed within the insulating substrate.

36. The short-circuit element according to claim 1, wherein the first and second heat-generating resistors are disposed on a surface of the insulating substrate opposite to an electrode-forming surface.

37. The short-circuit element according to claim 1, wherein the first and second heat-generating resistors are disposed on an electrode-forming surface of the insulating substrate.

38. The short-circuit element according to claim 1, wherein surfaces of the first electrode and the second electrode are coated with one of Ni/Au plating, Ni/Pd plating and Ni/Pd/Au plating.

39. The short-circuit element according to claim 1, wherein the first electrode has an area wider than that of the third electrode, and the second electrode has an area wider than those of the fourth and fifth electrodes.

40. The short-circuit element according to claim 1 further comprising:
a covering member arranged on the insulating substrate for internal protection; and
a covering member electrode arranged on an inner surface of the covering member,
wherein the covering member electrode is arranged at a position which overlaps the first electrode and the second electrode.

41. The short-circuit element according to claim 1 further comprising a protective resistor arranged on the insulating substrate and connected to one of the first electrode and the second electrode.

42. The short-circuit element according to claim 1, wherein at least one of the first and second meltable conductors are a Pb free solder consisting essentially of Sn.

43. The short-circuit element according to claim 1,
wherein at least one of the first and second meltable conductors contains a low melting point metal and a high melting point metal, and
wherein the low melting point metal is melted by a heat generated by the heat-generating resistor and erodes the high melting point metal.

44. The short-circuit element according to claim 43,
wherein the low melting point metal is a solder, and
wherein the high melting point metal is Ag, Cu or an alloy consisting essentially of Ag or Cu.

45. The short-circuit element according to claim 43, wherein at least one of the first and second meltable conductors has a coated structure in which the low melting point metal constitutes an inner layer and the high melting point metal constitutes an outer layer.

46. The short-circuit element according to claim 43, wherein at least one of the first and second meltable conductors has a coated structure in which the high melting point metal constitutes an inner layer and the low melting point metal constitutes an outer layer.

47. The short-circuit element according to claim 43, wherein at least one of the first and second meltable conductors has a laminated structure in which the low melting point metal and the high melting point metal are laminated.

48. The short-circuit element according to claim 43, wherein at least one of the first and second meltable conductor has a multi-layered structure having four or more layers in which the low melting point metal and the high melting point metal are alternately laminated.

49. The short-circuit element according to claim 43, wherein at least one of the first and second meltable conductors has a stripe-shaped structure in which the high melting point metal partially overlaps a surface of the low melting point metal.

50. The short-circuit element according to claim 43, wherein at least one of the first and second meltable conductors is constituted of a high melting point metal having a plurality of openings and a low melting point metal inserted in the openings.

51. The short-circuit element according to claim 43, wherein, in at least one of the first and second meltable conductors, the volume of the low melting point metal is larger than that of the high melting point metal.

52. The short-circuit element according to claim 1, wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

53. The short-circuit element according to claim 52, wherein the external connecting terminal is one of a metal bump and a metal post.

54. The short-circuit element according to claim 53, wherein in the metal bump or metal post, a low melting point metal layer is formed on a high melting point metal surface.

55. The short-circuit element according to claim 54, wherein the high melting point metal consists essentially of copper or silver, and the low melting point metal is a lead-free solder consisting essentially of tin.

56. The short-circuit element according to claim 52, wherein the external connecting terminal is a metal bump made of a lead-free solder consisting essentially of tin.

57. A short-circuit element circuit comprising:
a switch;
a first fuse connected to one end of the switch;
a first heat-generating resistor connected to an open end of the first fuse;
a second and a third fuses serially connected to an open end of the switch; and
a second heat-generating resistor connected to a connecting point of the second and the third fuses,
wherein the second and the third fuses are blown by a heat generated by the second heat-generating resistor, and
wherein the first fuse is blown by a heat generated by the first heat-generating resistor, and the switch is short-circuited by meltable conductor of the first fuse.

58. A compensation circuit comprising:
a short-circuit element comprising a switch, a first fuse connected to one end of the switch, a first heat-generating resistor connected to an open end of the first fuse, a second and a third fuses serially connected to an open end of the switch, and a second heat-generating resistor connected to a connecting point of the second and the third fuses, wherein the second and the third fuses are blown by a heat generated by the second heat-generating resistor, and the first fuse is blown by a heat generated by the first heat-generating resistor, and the switch is short-circuited by meltable conductor of the first fuse;
an electronic component;
a protective component which detects an abnormality of the electronic component and outputs an abnormal signal; and
a first and a second controlling elements which operate in accordance with the abnormal signal from the protective component,
wherein the second and third fuses are serially connected to the electronic component to constitute a current path,
wherein the connecting point of the switch and the first fuse is bypassed to an open end of the electronic component,
wherein the first controlling element is connected to an open end of the first heat-generating resistor,
wherein the second controlling element is connected to an open end of the second heat-generating resistor, and
wherein in an abnormal situation of the electronic component, the first and second controlling elements operate in accordance with an abnormal signal from the protective component to disconnect the current path of the electronic component and to short-circuit the switch in conjunction with melting of the first fuse to form a bypass current path.

59. The compensation circuit according to claim 58, wherein the protective component, and the first and second controlling elements are controlled such that the protective element disconnects the current path and then the short-circuit element forms a bypass current path.

60. The compensation circuit according to claim 59, wherein a protective resistor having a resistance corresponding to an internal resistance of the electronic component is connected in the bypass current path.

61. The compensation circuit according to claim 58, wherein the electronic component is a battery cell having a risk of electrical short-circuit or thermal runaway occurring in an abnormal situation.

62. The compensation circuit according to claim 61, wherein a protective resistor having a resistance corresponding to an internal resistance of the electronic component is connected in the bypass current path.

63. The compensation circuit according to claim 58, wherein a protective resistor having a resistance corresponding to an internal resistance of the electronic component is connected in the bypass current path.

64. A short-circuit element circuit comprising:
a switch;
a first fuse connected to one end of the switch;
a first heat-generating resistor connected to an open end of the first fuse;
a protective resistor connected to a connecting point of the switch and the first fuse;
a second and a third fuses serially connected to an open end of the switch; and
a second heat-generating resistor connected to a connecting point of the second and the third fuses,
wherein the second and the third fuses are blown by a heat generated by the second heat-generating resistor, and
wherein the first fuse is blown by a heat generated by the first heat-generating resistor, and the switch is short-circuited by meltable conductor of the first fuse.

65. A compensation circuit comprising:
a short-circuit element comprising a switch, a first fuse connected to one end of the switch, a first heat-generating resistor connected to an open end of the first fuse, a protective resistor connected to a connecting point of the switch and the first fuse, a second and a third fuses serially connected to an open end of the switch, and a second heat-generating resistor connected to a connecting point of the second and the third fuses, wherein the second and the third fuses are blown by a heat generated by the second heat-generating resistor, and the first fuse is blown by a heat generated by the first heat-generating resistor, and the switch is short-circuited by meltable conductor of the first fuse;

an electronic component;

a protective component which detects an abnormality of the electronic component and outputs an abnormal signal; and a first and a second controlling elements which operate in accordance with the abnormal signal from the protective component, wherein the second and third fuses are serially connected to the electronic component to constitute a current path, wherein an open end of the protective resistor is bypassed to an open end of the electronic component, wherein the first controlling element is connected to an open end of the first heat-generating resistor, wherein the second controlling element is connected to an open end of the second heat-generating resistor, and wherein, in an abnormal situation of the electronic component, the first and second controlling elements operate in accordance with an abnormal signal from the protective component to disconnect the current path of the electronic component and to short-circuit the switch in conjunction with melting of the first fuse to form a bypass current path.

66. The compensation circuit according to claim 65, wherein the protective component, and the first and second controlling elements are controlled such that the protective element disconnects the current path and then the short-circuit element forms a bypass current path.

67. The compensation circuit according to claim 66, wherein the electronic component is a battery cell having a risk of electrical short-circuit or thermal runaway occurring in an abnormal situation.

68. The compensation circuit according to claim 65, wherein the electronic component is a battery cell having a risk of electrical short-circuit or thermal runaway occurring in an abnormal situation.

69. A mounting member in which a short-circuit element is mounted onto a mounting target, the short-circuit element comprising:

an insulating substrate;

a first and a second heat-generating resistors formed on the insulating substrate;

a first and a second electrodes arranged adjacently to each other on the insulating substrate;

a third electrode arranged adjacently to the first electrode on the insulating substrate and electrically connected to the first heat-generating resistor;

a fourth electrode arranged adjacently to the second electrode on the insulating substrate and electrically connected to the second heat-generating resistor;

a fifth electrode arranged adjacently to the fourth electrode;

a first meltable conductor arranged between the first and third electrodes to constitute a current path capable of being blown by a heat generated by the first heat-generating resistor;

a second meltable conductor arranged between the second and fifth electrodes through the fourth electrode to constitute a current path, in which the current paths between the second and fourth electrodes and between the fourth and fifth electrodes are capable of being blown by a heat generated by the second heat-generating resistor; and a first external connecting electrode continuous with the first electrode formed on the same surface as the first and second electrodes, and a second external connecting electrode continuous with the second electrode, wherein the first electrode is connected to the mounting target via the first external connecting terminal connected to the first external connecting electrode, and the second electrode is connected to the mounting target via the second external connecting terminal connected to the second external connecting electrode, and wherein a combined resistance of the first external connecting terminal and the second external connecting terminal is lower than a conduction resistance between the first and second external connecting electrodes when the first meltable conductor is melted by the heat from the first and second heat-generating resistors and gathers on the first and second electrodes to short-circuit the first and second electrodes.

* * * * *